(12) United States Patent
Bai

(10) Patent No.: US 10,626,340 B2
(45) Date of Patent: *Apr. 21, 2020

(54) SYSTEMS AND METHODS FOR PRODUCING ENGINEERED FUEL FEED STOCKS FROM WASTE MATERIAL

(71) Applicant: Accordant Energy, LLC, Rutland, VT (US)

(72) Inventor: Dingrong Bai, Rutland, VT (US)

(73) Assignee: Accordant Energy, LLC, Rutland, VT (US)

( * ) Notice: Subject to any disclaimer, the term of this patent is extended or adjusted under 35 U.S.C. 154(b) by 276 days.

This patent is subject to a terminal disclaimer.

(21) Appl. No.: 15/487,019

(22) Filed: Apr. 13, 2017

(65) Prior Publication Data

US 2017/0283726 A1 Oct. 5, 2017

Related U.S. Application Data

(63) Continuation of application No. 15/256,282, filed on Sep. 2, 2016, now Pat. No. 9,650,584, which is a
(Continued)

(51) Int. Cl.
 *C10L 5/46* (2006.01)
 *C10L 5/06* (2006.01)
(Continued)

(52) U.S. Cl.
 CPC .............. *C10L 5/46* (2013.01); *B02C 23/14* (2013.01); *B02C 23/18* (2013.01); *B02C 23/30* (2013.01);
(Continued)

(58) Field of Classification Search
 CPC ......... B02C 23/18; B02C 23/30; B02C 23/14; C10L 5/40; C10L 5/46; C10L 5/363; C10L 5/06; C10L 5/406
 See application file for complete search history.

(56) References Cited

U.S. PATENT DOCUMENTS 3,429,805 A 2/1969 Karbosky
3,759,036 A 9/1973 White
(Continued)

FOREIGN PATENT DOCUMENTS

CN 1224683 C 10/2005
CN 1915635 2/2007
(Continued)

OTHER PUBLICATIONS

Supplementary European Search Report for European Patent Application No. 09771018.0, dated Apr. 16, 2012, 5 pages.
(Continued)

*Primary Examiner* — Faye Francis
(74) *Attorney, Agent, or Firm* — Cooley LLP

(57) ABSTRACT

Systems and methods for producing engineered fuels from solid waste material are described herein. In some embodiments, a method includes receiving a waste stream at a multi-material processing platform and separating the waste stream to remove non-processable waste and marketable recyclables. The method further includes conveying processable materials to a material classification system and incorporating additives to produce an engineered fuel from the constituents of the waste stream.

44 Claims, 11 Drawing Sheets

Related U.S. Application Data continuation of application No. 14/742,483, filed on Jun. 17, 2015, which is a continuation of application No. 13/486,488, filed on Jun. 1, 2012, now Pat. No. 9,162,231.

(60) Provisional application No. 61/645,931, filed on May 11, 2012, provisional application No. 61/493,071, filed on Jun. 3, 2011.

(51) Int. Cl.

| | | |
|---|---|---|
| C10L 5/36 | (2006.01) | |
| C10L 5/40 | (2006.01) | |
| B02C 23/14 | (2006.01) | |
| B02C 23/30 | (2006.01) | |
| B02C 23/18 | (2006.01) | |
| C10L 5/08 | (2006.01) | |
| C10L 5/48 | (2006.01) | |
| C10J 3/72 | (2006.01) | |

(52) U.S. Cl.
CPC . *C10J 3/72* (2013.01); *C10L 5/06* (2013.01); *C10L 5/08* (2013.01); *C10L 5/363* (2013.01); *C10L 5/40* (2013.01); *C10L 5/406* (2013.01); *C10L 5/48* (2013.01); *C10J 2300/0946* (2013.01); *C10L 2200/0254* (2013.01); *C10L 2200/0469* (2013.01); *C10L 2290/24* (2013.01); *C10L 2290/28* (2013.01); *C10L 2290/30* (2013.01); *Y02E 50/10* (2013.01); *Y02E 50/30* (2013.01)

(56) References Cited

U.S. PATENT DOCUMENTS

| | | |
|---|---|---|
| 3,905,556 A | 9/1975 | Drage |
| 3,946,680 A | 3/1976 | Laman |
| 4,010,098 A | 3/1977 | Fassell |
| 4,052,173 A | 10/1977 | Schulz |
| 4,072,273 A | 2/1978 | Reiniger |
| 4,077,847 A | 3/1978 | Choi et al. |
| 4,152,119 A | 5/1979 | Schulz |
| 4,153,514 A | 5/1979 | Garrett et al. |
| 4,200,486 A | 4/1980 | Vagac et al. |
| 4,208,226 A | 6/1980 | Deardorff et al. |
| 4,236,897 A | 12/1980 | Johnston |
| 4,245,999 A | 1/1981 | Reiniger |
| 4,395,958 A | 8/1983 | Caffyn et al. |
| 4,440,635 A | 4/1984 | Reiniger |
| 4,515,601 A | 5/1985 | Charters |
| 4,529,407 A | 7/1985 | Johnston et al. |
| 4,561,860 A | 12/1985 | Gulley et al. |
| 4,859,211 A | 8/1989 | Moore |
| 4,888,852 A | 12/1989 | Varin |
| 4,891,099 A | 1/1990 | Silveri et al. |
| 4,913,069 A | 4/1990 | Schultz et al. |
| 4,919,686 A | 4/1990 | Edwards |
| 4,935,038 A | 6/1990 | Wolf |
| 5,040,972 A | 8/1991 | Gaunce et al. |
| 5,082,525 A | 1/1992 | Travis |
| 5,104,047 A | 4/1992 | Siimmons |
| 5,133,505 A | 7/1992 | Bourcier et al. |
| 5,134,944 A | 8/1992 | Keller et al. |
| 5,265,635 A | 11/1993 | Giammatteo et al. |
| 5,288,413 A | 2/1994 | Chu |
| 5,341,935 A | 8/1994 | Djerf et al. |
| 5,342,418 A | 8/1994 | Jesse |
| 5,348,163 A | 9/1994 | Tunison, III et al. |
| 5,356,082 A | 10/1994 | Prinz et al. |
| 5,397,066 A | 3/1995 | Leitman et al. |
| 5,413,487 A | 5/1995 | Lundell |
| 5,429,645 A | 7/1995 | Benson et al. |
| 5,441,990 A | 8/1995 | Robin et al. |
| 5,464,760 A | 11/1995 | Tsai et al. |
| 5,568,996 A | 10/1996 | Buehler |
| 5,643,342 A | 7/1997 | Andrews |
| 5,649,785 A | 7/1997 | Djerf et al. |
| 5,660,282 A | 8/1997 | Djerf et al. |
| 5,735,472 A | 4/1998 | Serres et al. |
| 5,888,256 A | 3/1999 | Morrison |
| 5,916,826 A | 6/1999 | White |
| 5,948,276 A | 9/1999 | Neureither et al. |
| 5,957,295 A | 9/1999 | Neureither |
| 5,976,435 A | 11/1999 | Djerf et al. |
| 5,980,595 A | 11/1999 | Andrews |
| 6,000,639 A | 12/1999 | Ganguli |
| 6,005,149 A | 12/1999 | Bishop |
| 6,113,662 A | 9/2000 | Sprules |
| 6,127,645 A | 10/2000 | Titus et al. |
| 6,165,238 A | 12/2000 | Parkinson et al. |
| 6,182,584 B1 | 2/2001 | Gaudio |
| 6,216,463 B1 | 4/2001 | Stewart |
| 6,270,655 B1 | 8/2001 | Ganguli |
| 6,271,270 B1 | 8/2001 | Muzzy et al. |
| 6,460,788 B1 | 10/2002 | de Feraudy |
| 6,630,113 B1 | 10/2003 | Surma |
| 6,635,093 B1 | 10/2003 | Schoen et al. |
| 6,653,517 B2 | 11/2003 | Bullock |
| 6,655,137 B1 | 12/2003 | Sardari |
| 6,692,544 B1 | 2/2004 | Grillenzoni |
| 6,818,027 B2 | 11/2004 | Murcia |
| 6,871,603 B2 | 3/2005 | Maxwell et al. |
| 6,945,484 B1 | 9/2005 | Terzini et al. |
| 7,014,132 B2 | 3/2006 | Vandeputte |
| 7,169,821 B2 | 1/2007 | Branson |
| 7,172,143 B2 | 2/2007 | Vandeputte |
| 7,229,483 B2 | 6/2007 | Lewis |
| 7,252,691 B2 | 8/2007 | Phillipson |
| 7,264,124 B2 | 9/2007 | Bohlig et al. |
| 7,302,897 B2 | 12/2007 | Pallett et al. |
| 7,314,002 B2 | 1/2008 | Dupuis |
| 7,341,156 B2 | 3/2008 | Bohlig et al. |
| 7,355,521 B2 | 4/2008 | McCauley et al. |
| 7,419,514 B2 | 9/2008 | Whitney |
| 7,503,513 B2 | 3/2009 | Simon |
| 7,674,303 B2 | 3/2010 | Flanery et al. |
| 7,803,848 B2 | 9/2010 | de Feraudy et al. |
| 7,807,727 B2 | 10/2010 | de Feraudy et al. |
| 7,869,900 B2 | 1/2011 | McCauley et al. |
| 8,051,986 B2 | 11/2011 | Lees |
| 8,146,841 B2 | 4/2012 | Andela |
| 8,157,874 B2 | 4/2012 | Bohlig et al. |
| 8,157,875 B2 | 4/2012 | Bohlig et al. |
| 8,201,692 B2 | 6/2012 | Valerio |
| 8,318,064 B2 | 11/2012 | Parish |
| 8,349,034 B2 | 1/2013 | Calabrese et al. |
| 8,382,862 B2 | 2/2013 | Bohlig et al. |
| 8,382,863 B2 | 2/2013 | Bohlig et al. |
| 8,444,721 B2 | 5/2013 | Bai |
| 8,459,581 B2 | 6/2013 | Bai |
| 8,523,962 B2 | 9/2013 | Bohlig et al. |
| 8,544,772 B2 | 10/2013 | Ginn |
| 8,579,997 B2 | 11/2013 | Bai |
| 8,616,378 B2 | 12/2013 | Guschall et al. |
| 8,632,024 B2 | 1/2014 | Gitschel et al. |
| 8,636,235 B2 | 1/2014 | Bai |
| 8,684,288 B2 | 4/2014 | Gitschel |
| 8,746,599 B2 | 6/2014 | Bai |
| 8,906,119 B2 | 12/2014 | Bohlig et al. |
| 9,126,204 B1 | 9/2015 | Toberman et al. |
| 9,162,231 B2 | 10/2015 | Bai |
| 9,199,280 B2 | 12/2015 | Viny |
| 9,217,188 B2 | 12/2015 | Bohlig et al. |
| 9,650,584 B2 | 5/2017 | Bai et al. |
| 9,765,269 B2 | 9/2017 | Bohlig et al. |
| 9,879,195 B2 | 1/2018 | Bai |
| 2002/0025285 A1 | 2/2002 | Comparato et al. |
| 2002/0033124 A1 | 3/2002 | Asanuma et al. |
| 2002/0184816 A1 | 12/2002 | Philipson |
| 2002/0195031 A1 | 12/2002 | Walker |
| 2003/0153797 A1 | 8/2003 | Percell |
| 2003/0178345 A1 | 9/2003 | Hautala et al. |
| 2004/0103831 A1 | 6/2004 | Pope |

(56) References Cited

U.S. PATENT DOCUMENTS

| | | |
|---|---|---|
| 2004/0134395 A1 | 7/2004 | Eberhardt et al. |
| 2004/0221778 A1 | 11/2004 | Pallett et al. |
| 2005/0080520 A1 | 4/2005 | Kline et al. |
| 2005/0209825 A1 | 9/2005 | Ogawa |
| 2005/0242006 A1 | 11/2005 | Bohlig et al. |
| 2006/0010714 A1 | 1/2006 | Carin et al. |
| 2006/0032113 A1 | 2/2006 | Whitney |
| 2006/0112616 A1 | 6/2006 | Noll et al. |
| 2006/0112639 A1 | 6/2006 | Nick et al. |
| 2006/0123697 A1 | 6/2006 | Jansen |
| 2006/0153797 A1 | 7/2006 | Bortolotto et al. |
| 2006/0225422 A1 | 10/2006 | Prentice, III |
| 2006/0254957 A1 | 11/2006 | Bohlig et al. |
| 2006/0278587 A1 | 12/2006 | Schien et al. |
| 2006/0280669 A1 | 12/2006 | Jones |
| 2007/0075870 A1 | 4/2007 | McCauley et al. |
| 2007/0078524 A1 | 4/2007 | McCauley et al. |
| 2007/0182776 A1 | 8/2007 | Parish et al. |
| 2007/0266751 A1 | 11/2007 | Black et al. |
| 2008/0014112 A1 | 1/2008 | Lee et al. |
| 2008/0041982 A1 | 2/2008 | Paulson et al. |
| 2008/0110090 A1 | 5/2008 | Zawadzki et al. |
| 2008/0121142 A1 | 5/2008 | Comrie et al. |
| 2008/0191069 A1 | 8/2008 | Hofmann et al. |
| 2008/0237093 A1 | 10/2008 | Bohlig et al. |
| 2008/0257794 A1 | 10/2008 | Valerio |
| 2008/0290006 A1 | 11/2008 | Duffy et al. |
| 2009/0095673 A1 | 4/2009 | Choate et al. |
| 2009/0175780 A1 | 7/2009 | Harris et al. |
| 2009/0235577 A1 | 9/2009 | Flanery et al. |
| 2009/0272028 A1 | 11/2009 | Drozd et al. |
| 2009/0299110 A1 | 12/2009 | Sarker |
| 2010/0018113 A1 | 1/2010 | Bohlig et al. |
| 2010/0031560 A1 | 2/2010 | Calabrese et al. |
| 2010/0038594 A1 | 2/2010 | Bohlig et al. |
| 2010/0126061 A1 | 5/2010 | Flanery et al. |
| 2010/0144905 A1 | 6/2010 | Reaveley et al. |
| 2010/0218419 A1 | 9/2010 | Bai |
| 2010/0287826 A1 | 11/2010 | Hoffman et al. |
| 2010/0294794 A1 | 11/2010 | Yaluris et al. |
| 2010/0308145 A1 | 12/2010 | Doyen et al. |
| 2011/0099890 A1 | 5/2011 | Bohlig et al. |
| 2011/0209397 A1 | 9/2011 | Bohlig et al. |
| 2011/0283705 A1 | 11/2011 | Oliver |
| 2012/0037733 A1 | 2/2012 | Gitschel |
| 2012/0048974 A1 | 3/2012 | Gitschel |
| 2012/0048975 A1 | 3/2012 | Gitschel |
| 2012/0086429 A1 | 4/2012 | Kluin et al. |
| 2012/0190102 A1 | 7/2012 | Gitschel et al. |
| 2012/0304535 A1 | 12/2012 | Bai |
| 2012/0304536 A1 | 12/2012 | Bai |
| 2012/0305686 A1 | 12/2012 | Bai |
| 2012/0305688 A1 | 12/2012 | Bai |
| 2014/0134694 A1 | 5/2014 | Gitschel et al. |
| 2016/0010012 A1 | 1/2016 | Bai |
| 2016/0090540 A1 | 3/2016 | Bohlig et al. |
| 2016/0230108 A1 | 8/2016 | Bai |
| 2016/0369195 A1 | 12/2016 | Bai |
| 2018/0037830 A1 | 2/2018 | Bohlig et al. |
| 2018/0327682 A1 | 11/2018 | Bai |

FOREIGN PATENT DOCUMENTS

| | | |
|---|---|---|
| CN | 101280237 | 10/2008 |
| CN | 101508928 | 8/2009 |
| CN | 101787315 | 7/2010 |
| CN | 102076832 | 5/2011 |
| EP | 0305782 | 3/1989 |
| EP | 0444684 | 9/1991 |
| EP | 0776962 | 6/1997 |
| EP | 1167494 | 1/2002 |
| EP | 1616637 | 1/2006 |
| FR | 2923403 | 5/2009 |
| JP | H10-310783 | 11/1998 |
| JP | 2000-140800 | 5/2000 |
| JP | 2000-227211 | 8/2000 |
| JP | 2002-295821 | 10/2002 |
| JP | 2003-094436 | 4/2003 |
| JP | 2003-268387 | 9/2003 |
| JP | 2004-239515 | 8/2004 |
| WO | WO 2009/158486 | 12/2009 |
| WO | WO 2009/158539 | 12/2009 |
| WO | WO 2009/158540 | 12/2009 |
| WO | WO 2010/013202 | 2/2010 |
| WO | WO 2012/071060 | 5/2012 |
| WO | WO 2012/071112 | 5/2012 |
| WO | WO 2012/167070 | 12/2012 |

OTHER PUBLICATIONS

International Search Report and Written Opinion for International Application No. PCT/US2009/048638, dated Aug. 14, 2009, 9 pages.
International Preliminary Report on Patentability for International Application No. PCT/US2009/048638, dated Jan. 5, 2011, 8 pages.
International Search Report and Written Opinion for International Application No. PCT/US2013/23498, dated Jul. 10, 2013, 12 pages.
International Search Report and Written Opinion for International Application No. PCT/US2012/040447, dated Aug. 17, 2012, 10 pages.
International Preliminary Report on Patentability for International Application No. PCT/US2012/040447, dated Dec. 4, 2013, 7 pages.
Biobib a Data Base for Biofuels online (http://www.vt.tuwien.ac.at/biobib/biobib.html), 12 pages (2007).
Waste Management, Inc. [online], "Recycling Residue," [Retrieved from the Internet: <http://www.wm.com/location/california/north-county/oceanside/env/recycle-residue.jsp>, (2016), 1 page.
United States Environmental Protection Agency, "Municipal Solid Waste in the United States. 2007 Facts and Figures," Table of Contents, 5 pages, Nov. 2008.
Office Action for U.S. Appl. No. 13/832,447 dated Aug. 28, 2014, 6 pages.
Notice of Allowance for U.S. Appl. No. 13/832,447 dated Dec. 16, 2014, 8 pages.
Notice of Allowance for U.S. Appl. No. 13/832,447 dated Mar. 26, 2015, 7 pages.
Notice of Allowance for U.S. Appl. No. 13/832,447 dated Jul. 17, 2015, 7 pages.
KeLa Energy, LLC, KeLa Engineered Fuels, Mar. 2008, Powerpoint, 21 pages.
KeLa Energy, LLC, CIBO, Technical Focus Group Environmental & Energy Committee Meetings, Sep. 2009, Powerpoint, 16 pages.
Fyffe, J. R. et al., "Residue-Derived Solid Recovered Fuel for Use in Cement Kilns," Jul. 1, 2012, 114 pages.
United States Environmental Protection Agency (USEPA)—Office of Resource Conservation and Recovery, Request for comfort letter (and enclosures) from Waste Management to USEPA dated Mar. 16, 2012, 18 pages.
United States Environmental Protection Agency (USEPA)—Office of Resource Conservation and Recovery, Letter (and enclosures) from Waste Management to USEPA dated Dec. 6, 2012 regarding third party FOIA requests, 257 pages.
United States Environmental Protection Agency (USEPA)—Office of Resource Conservation and Recovery, Comfort letter (and various footnoted materials) from USEPA to Waste Management dated Aug. 22, 2013, 97 pages.
Bauers, S., "Trash plan—and pellets—approved, more talk about all," Philly.com, Posted Thursday, Jun. 7, 2012, 5 pages.
Hasselriis, F., "Refuse-Derived Fuel Processing," Butterworth Publishers, 1984, pp. 275-298.
Even, J. C. et al., "Evaluation of the Ames Solid Waste Recovery System, Part I, Summary of Environmental Emissions: Equipment, Facilities, and Economic Evaluations," EPA-600/2-77-205 (Nov. 1977).
Fiscus, D. E. et al., "Evaluation of the Performance of the Disc Screens Installed at the City of Ames, Iowa Resource Recovery Facility," Proc. ASME National Waste Processing Conf., Washington, DC, 1980.

(56) References Cited

OTHER PUBLICATIONS

Fiscus, D. E. et al., "Study of Existing RDF-Cofiring Experience, vol. 3: Phase II Final Report," ANL/CNSV-TM-134, vol. 3, Oct. 31, 1983.

Refuse Derived Fuel, Current Practice and Perspectives (B4-3040/2000/306517/MAR/E3) Final Report No. CO 5087-4, Jul. 2003.

Garg, A. et al., "Wastes as Co-Fuels: the Policy Framework for Solid Recovered Fuel (SRF) in Europe, with UK Implications," Environ. Sci. Technol., 41(14):4868-4874 (2007).

Raghunathan, K. et al., "Prevention of PCDD/PCDF Formation by Coal Co-Firing," U.S. Environmental Protection Agency, Air Pollution Prevention and Control Division (1998), pp. 779-793.

Canova, J. H., "Testing and Evaluating the Combustion Characteristics of Waste Fuels," (1992), 120 pages.

Fritsky, K. J. et al., "Methodology for Modeling the Devolatilization of Refuse-Derived Fuel from Thermogravimetric Analysis of Municipal Solid Waste Components," J. Air & Waste Manage. Assoc. 44:9, 1116-1123 (1994).

U.S. Environmental Protection Agency, Cement Sector, Trends in Beneficial Use of Alternative Fuels and Raw Materials, Oct. 2008, 117 pages.

Boavida, D. et al., "Co-combustion of coal and non-recyclable paper and plastic waste in a fluidised bed reactor," Fuel, 82 (2003) 1931-1938.

Cozzani, V. et al., "Devolatilization and pyrolysis of refuse derived fuels: characterization and kinetic modelling by a thermogravimetric and calorimetric approach," Fuel, 74(6):903-912 (1995).

Fisher, M. M. et al., "Processed engineered fuels derived from paper and plastic—Techno-economic factors and regulatory issues in a competitive market," Proceedings of Fifth Annual North American Waste-to-Energy Conference, Research Triangle Park, North Carolina, Apr. 22-25, 1997, pp. 475-488.

Hasselriis, F., "Refuse-Derived Fuel Processing," Butterworth Publishers, 1984, pp. 1-340.

Tomczyk, L., "Engineered Fuel: Renewable Fuel of the Future?," Solid Waste Technologies, Jan./Feb. 1997, 10 pages.

Partial European Search Report and Search Opinion for European Application No. 17171330.8, dated Sep. 22, 2017, 11 pages.

Elemental Content Phyllis Database at http://www.ecn.nl/phyllis/dataTable.asp, May 1998, 5 pages.

SYSTEMS AND METHODS FOR PRODUCING ENGINEERED FUEL FEED STOCKS FROM WASTE MATERIAL

CROSS REFERENCE TO RELATED APPLICATIONS

This application is a continuation of and claims priority to U.S. application Ser. No. 15/256,282, entitled "Systems and Methods for Producing Engineered Fuel Feed Stocks From Waste Material", filed Sep. 2, 2017, which is a continuation of and claims priority to U.S. application Ser. No. 14/742,483, entitled "Systems and Methods for Producing Engineered Fuel Feed Stocks From Waste Material", filed Jun. 17, 2015, which is a continuation of and claims priority to U.S. application Ser. No. 13/486,488, now U.S. Pat. No. 9,162,231 entitled "Systems and Methods for Producing Engineered Fuel Feed Stocks From Waste Material," filed Jun. 1, 2012, which claims priority to and the benefit of U.S. Provisional Application Ser. No. 61/493,071, entitled "Systems, Methods and Processes for Granulating Heterogeneous Waste Streams for Engineered Fuel Feedstock Production," filed Jun. 3, 2011, and U.S. Provisional Application Ser. No. 61/645,931, entitled "Systems and Methods for Producing Engineered Fuel Feed Stocks From Waste Material," filed May 11, 2012, each of which is incorporated herein by reference.

This application is also related to U.S. patent application Ser. No. 13/486,484, entitled "Systems and Methods for Processing a Heterogeneous Waste Stream," filed Jun. 1, 2012, the disclosure of which is incorporated herein in its entirety.

BACKGROUND

The disclosure relates to alternative fuels, chemicals, and fuel feed stocks. In particular, the disclosure relates to systems and methods for producing an engineered fuel feed stock having additives to control emissions, prevent corrosion, and/or improve operational performance during combustion or gasification applications. The feed stock described herein includes at least one component of processed solid waste, an additive, and optionally other components.

Sources of fossil fuels useful for heating, transportation, and the production of chemicals as well as petrochemicals are becoming increasingly scarce and costly. Industries such as those producing energy and petrochemicals are actively searching for cost-effective engineered fuel feed stock alternatives for use in generating those products and many others. Additionally, due to the ever increasing costs of fossil fuels, transportation costs for moving engineered fuel feed stocks for production of energy and petrochemicals is rapidly escalating.

These energy and petrochemical producing industries, and others, have relied on the use of fossil fuels, such as coal and oil and natural gas, for use in combustion and gasification processes for the production of energy, for heating and electricity, and the generation of synthesis gas used for the downstream production of chemicals and liquid fuels, as well as an energy source for turbines.

One potentially significant source of feed stock for production of an engineered fuel is solid waste. Solid waste, such as municipal solid waste (MSW), is typically disposed of in landfills or used in combustion processes to generate heat and/or steam for use in turbines. The drawbacks accompanying combustion include the production of pollutants such as nitrogen oxides, sulfur oxides, particulates and products of chlorine that are damaging to the environment.

Thus, there is a need for alternative fuels that burn efficiently and cleanly and that can be used for the production of energy and/or chemicals. There is at the same time a need for waste management systems that implement methods for reducing green house gas emissions of waste by utilizing such wastes. In particular, there is a need for improved systems and methods for sorting waste material and reclaiming a resource value from components of the waste material. By harnessing and using the energy content contained in waste, it is possible to reduce green house gas emissions and/or otherwise reduce emissions generated during the processing of wastes thereby effectively using the waste generated by commercial and residential consumers.

SUMMARY

Systems and methods for producing engineered fuels from solid waste material are described herein. In some embodiments, a method includes receiving a waste stream at a multi-material processing platform and separating the waste stream to remove non-processable waste and marketable recyclables. The method further includes conveying processable materials to a material classification system and incorporating additives to produce an engineered fuel from the constituents of the waste stream.

DETAILED DESCRIPTION

Figure 1:
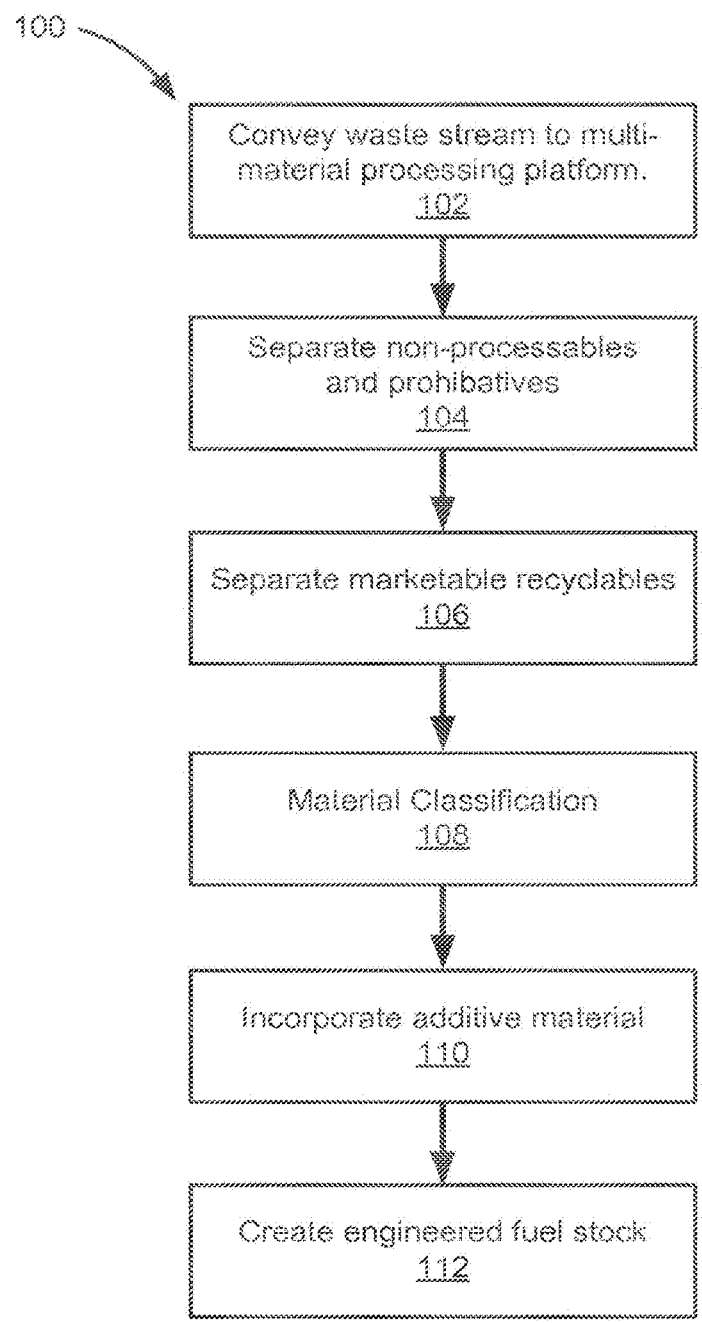
FIG. 1 is a flowchart illustrating a method for producing an engineered fuel feed stock from waste material, according to an embodiment.

Systems and methods for producing engineered fuels from solid waste material are described herein. In some embodiments, a method includes receiving a waste stream at a multi-material processing platform and separating the waste stream to remove non-processable waste, prohibitive items and marketable recyclables. The method further includes conveying processable materials to a material classification system and incorporating additives to produce an engineered fuel from the constituents of the waste stream.

The term "about" generally means plus or minus 10% of the value stated, e.g. about 5 would include 4.5 to 5.5, about 10 would include 9 to 11, about 100 would include 90 to 110.

The term "carbon content" means all carbon contained in the fixed carbon (see definition below) as well as in all the volatile matters in the feed stock.

The term "commercial waste" means solid waste generated by stores, offices, restaurants, warehouses, and other non-manufacturing, non-processing activities. Commercial waste does not include household, process, industrial or special wastes.

The term "construction and demolition debris" (C&D) means uncontaminated solid waste resulting from the construction, remodeling, repair and demolition of utilities, structures and roads; and uncontaminated solid waste resulting from land clearing. Such waste includes, but is not limited to bricks, concrete and other masonry materials, soil, rock, wood (including painted, treated and coated wood and wood products), land clearing debris, wall coverings, plaster, drywall, plumbing fixtures, non-asbestos insulation, roofing shingles and other roof coverings, asphaltic pavement, glass, plastics that are not sealed in a manner that conceals other wastes, empty buckets ten gallons or less in size and having no more than one inch of residue remaining on the bottom, electrical wiring and components containing no hazardous liquids, and pipe and metals that are incidental to any of the above. Solid waste that is not C&D debris (even if resulting from the construction, remodeling, repair and demolition of utilities, structures and roads and land clearing) includes, but is not limited to asbestos waste, garbage, corrugated container board, electrical fixtures containing hazardous liquids such as fluorescent light ballasts or transformers, fluorescent lights, carpeting, furniture, appliances, tires, drums, containers greater than ten gallons in size, any containers having more than one inch of residue remaining on the bottom and fuel tanks. Specifically excluded from the definition of construction and demolition debris is solid waste (including what otherwise would be construction and demolition debris) resulting from any processing technique, that renders individual waste components unrecognizable, such as pulverizing or shredding.

The term "fiber" means materials including, but not limited to, textiles, wood, biomass, papers, fiberboard and cardboard. In addition, the term "fibers" can refer to the aforementioned materials with a bulk density of about 4 pounds per cubic foot, and generally include naturally occurring or man-made products based on woody, cellulostic or lignocellulostic biomass, plants and living stocks. In terms of chemical characteristics, the fiber materials typically have a carbon content of 35-50 wt. % with an average of about 45 wt. %, a hydrogen content of 5-7% wt. % with an average of about 6 wt. %, an oxygen content of 35-45 wt. % with an average of about 40 wt. %, and a higher heating value of about 6,000-9,000 Btu/lb with an average of about 7,500 Btu/lb, all in a dry basis.

The term "fixed carbon" means the balance of material after moisture, ash, and volatile matter are excluded, as determined by proximate analysis.

The term "garbage" means putrescible solid waste including animal and vegetable waste resulting from the handling, storage, sale, preparation, and cooking or serving of foods. Garbage originates primarily in home kitchens, stores, markets, restaurants and other places where food is stored, prepared or served.

The term "hard plastic", also referred to as rigid plastic, means plastic materials including, but not limited to, high-density polyethylene, polyethylene terephthalate, and polyvinyl chloride. In addition, the term "hard plastic" can refer to the aforementioned materials with a bulk density of about 15-25 pounds per cubic foot and actual material density of about 56-87 pounds per cubic foot.

The term "hazardous waste" means solid waste that exhibits one of the four characteristics of a hazardous waste (reactivity, corrosivity, ignitability, and/or toxicity) or is specifically designated as such by the EPA as specified in 40 CFR part 262.

The term "marketable recyclables" means materials for which there is an active market where the materials can be sold as commodities, including but not limited to, old corrugated cardboard (OCC), old newspaper (ONP), mixed paper, high-density polyethylene (HDPE), polyethylene terephthalate (PET), mixed plastics, ferrous metals, and/or nonferrous metals, and glass.

The term "municipal solid waste" (MSW) means solid waste generated at residences, commercial or industrial establishments, and institutions, and includes all processable wastes along with all components of construction and demolition debris that are processable, but excluding hazardous waste, automobile scrap and other motor vehicle waste, used tires, infectious waste, asbestos waste, contaminated soil and other absorbent media and ash other than ash from household stoves. Components of municipal solid waste include without limitation plastics, fibers, paper, yard waste, rubber, leather, wood, and also recycling residue, a residual component containing the non-recoverable portion of recyclable materials remaining after municipal solid waste has been processed with a plurality of components being sorted from the municipal solid waste.

The term "non-processable waste" (also known as non-combustible waste) means waste that does not readily gasify in gasification systems and does not give off any meaningful contribution of carbon or hydrogen into the synthesis gas generated during gasification. Non-processable wastes include but are not limited to: batteries, such as dry cell batteries, mercury batteries and vehicle batteries; refrigerators; stoves; freezers; washers; dryers; bedsprings; vehicle frame parts; crankcases; transmissions; engines; lawn mowers; snow blowers; bicycles; file cabinets; air conditioners; hot water heaters; water storage tanks; water softeners; furnaces; oil storage tanks; metal furniture; propane tanks; and yard waste.

The term "processed MSW waste stream" means that MSW has been processed at, for example, a materials recovery facility, by having been sorted according to types of MSW components. Types of MSW components include, but are not limited to, plastics, including soft plastics and hard plastics (e.g., #1 to #7 plastics and other polymers such as Acrylonitrile-butadiene-styrene (ABS), Polyamide (also called nylon, PA), Poly(butylene terephthalate)—PBT), fibers, paper, yard waste, rubber, leather, wood, and also recycling residue, a residual component containing the non-recoverable portion of recyclable materials remaining after municipal solid waste has been processed with a plurality of components being sorted from the municipal solid waste. Processed MSW contains substantially no glass, metals, or grit. Grit includes dirt, dust, and sand, and as such the processed MSW contains substantially no non-combustibles.

The term "processable waste" means wastes that is readily processable by equipment such as shredders, density separators, optical sorters, etc. and can be used as fuel feedstock in thermal and biological conversion processes. Processable waste includes, but is not limited to, newspaper, junk mail, corrugated cardboard, office paper, magazines, books, paperboard, other paper, rubber, textiles, and leather from residential, commercial, and institutional sources only, wood, food wastes, and other combustible portions of the MSW stream.

The term "recycling residue" means the residue remaining after a recycling facility has processed its recyclables from incoming waste which cannot be marketed and thus no longer contains economic value from a recycling point of view.

The term "sludge" means any solid, semisolid, or liquid generated from a municipal, commercial, or industrial wastewater treatment plant or process, water supply treatment plant, air pollution control facility or any other such waste having similar characteristics and effects.

The term "soft plastics" means plastic films, bags and foams, such as low density polyethylene, expanded polystyrene, and extruded polystyrene foam. In addition, the term "soft plastic" can refer to the aforementioned materials with a bulk density of about 1-4 pounds per cubic foot and which are typically two-dimensional or flat in shape.

The term "solid waste" means unwanted or discarded solid material with insufficient liquid content to be free flowing, including, but not limited to rubbish, garbage, scrap materials, junk, refuse, inert fill material, and landscape refuse, but does not include hazardous waste, biomedical waste, septic tank sludge, or agricultural wastes, animal manure and absorbent bedding used for soil enrichment or solid or dissolved materials in industrial discharges. The fact that a solid waste, or constituent of the waste, may have value, be beneficially used, have other use, or be sold or exchanged, does not exclude it from this definition.

The term "sorbent" means a material added to the engineered fuel feed stock that either acts as a traditional sorbent and adsorbs a chemical or elemental by-product, or reacts with a chemical or elemental by-product, or in other cases, simply as an additive to alter the fuel feed stock characteristics such as ash fusion temperature.

In some embodiments, a waste management system includes a tipping floor, a screen, a primary shredder, a secondary shredder, a set of separators, a material classification subsystem, and an engineered fuel production subsystem. In some embodiments, the tipping floor can be configured to receive at least a portion of a waste stream to be processed within or by the waste management system. The screen is configured to process the incoming waste by removing undersized fraction of the waste consisting primarily of non combustibles, batteries, and food waste. The primary shredder is configured to shred the waste material to a predetermined size such that remaining non-processable and non-combustible waste can be separated from the waste stream by the set of separators. The set of separators can include a magnetic separator, an eddy current separator, an optical separator, and/or a glass separator. The secondary shredder can be configured to receive the processable waste stream and shred the processable waste to a predetermined size. The material classification subsystem can be configured to further separate (i.e., classify) the processable waste and deliver the classified waste to the engineered fuel production subsystem. The engineered fuel production subsystem is configured to receive the classified waste material from the material classification subsystem and selectively produce an engineered fuel.

FIG. 1 is a flowchart illustrating a method 100 for producing an engineered fuel feed stock from solid waste material. The method 100 includes conveying a waste stream to a multi-material processing platform 102. In some embodiments, the waste stream can be, for example, MSW, recycling residue, and/or any combination thereof. In some embodiments, the waste stream can be delivered to a tipping floor of a waste material receiving facility. The method 100 includes separating non-processables and prohibitives 104 from the waste stream. In some embodiments, the non-processables can be removed from the waste stream before the waste stream is conveyed to the tipping floor of the waste material receiving facility (e.g., at a previous waste handling facility).

The method 100 further includes separating marketable recyclables 106 from the waste stream. The marketable recyclables can be separated using any suitable method. In some embodiments, the marketable recyclables are separated manually (e.g., by hand). In other embodiments, the waste stream can be fed into a separator and/or series of separators. For example, in some embodiments, the separators can include a magnetic separator (e.g., to remove ferrous metals), a disc separator (e.g., to remove relatively large pieces of OCC, ONP, mixed plastics, etc.), an eddy current separator (e.g., to remove non-ferrous metals), an optical sorter separator and/or any other suitable separator (e.g. XRF sensor based separator). In this manner, materials with a sufficiently high market value can be removed (e.g., separated) from the waste stream and further processed (e.g., bailed, stored, shipped, etc.) to be sold as a marketable material. Systems and methods of processing and sorting marketable recyclables are described in U.S. Pat. No. 7,264,124 to Bohlig et al., filed Nov. 17, 2004, entitled "Systems and Methods for Sorting Recyclables at a Material Recovery Facility," U.S. Pat. No. 7,341,156 to Bohlig et al., filed Apr. 15, 2005, entitled "Systems and Methods for Sorting, Collecting Data Pertaining to and Certifying Recyclables at a Material Recovery Facility," and U.S. Patent Publication No. 2008/0290006 to Duffy et al., filed May 23, 2007, entitled "Systems and Methods for Optimizing a Single-Stream Materials Recovery Facility," the disclosures of which are hereby incorporated herein by reference, in their entireties.

With the non-processables, prohibitives and the marketable recyclables removed from the waste stream, the waste stream can be conveyed to a material classification subsystem 108. In some embodiments, the conveying of the waste stream can include passing the waste stream through at least one shredder configured to reduce the size of the constituents of the waste stream. For example, in some embodiments, the shredder can be configured to reduce the size of the constituents of the waste stream to be less than about 4 inches. In other embodiments, the shredder can be configured to reduce the size of the constituents of the waste stream to be between about 0.75 inches and about 1 inch. In still other embodiments, the shredder can be configured to reduce the size of the constituents of the waste stream to be between about 0.1875 inches and about 0.25 inches. With the size of the constituents of the waste stream reduced, the conveying of the waste stream to the material classification subsystem can further include passing the waste stream through a set of separators. In some embodiments, the set of separators can include, for example, a density separator, a magnetic separator, an eddy current separator, a glass separator, and/or the like. For example, in some embodiments, the shredded waste stream can pass through a density separator such that materials with a density below a predetermined threshold pass to the material classification subsystem and material with a density above the predetermined threshold pass to a secondary subsystem (e.g., further separated to remove marketable recyclables not separated in the first separation process) and/or are disposed of (e.g., conveyed to a landfill).

The material classification subsystem can be configured to further separate a desired set of materials. For example, in some embodiments, the material classification subsystem receives a waste stream including hard plastics, soft plastics, and/or fibers. In such embodiments, the material classification subsystem can separate the hard plastics, soft plastics, and/or fibers via any suitable method. For example, in some embodiments, the material classification subsystem can include cyclonic separators, fluidized beds, density separators, and/or the like. With the waste stream further separated by the material classification subsystem, the method 100 includes selectively mixing additive material 110 to one or more components of the separated waste stream. The additive material can include, for example, chemical additives, sorbents, biomass waste (e.g., wood), biomaterials (e.g., animal manure), and/or any other suitable additive. With the additive material mixed with at least a portion of the waste stream, the portion of the waste stream can be processed into an engineered fuel feed stock 112.

In some embodiments, at least a portion of the waste stream and the additive material can be compressed to form a densified intermediate material. The densified intermediate material can be in the form of cubes, briquettes, pellets, honeycomb, or other suitable shapes and forms. For example, in some embodiments, chemical additives (e.g., sorbents, nutrients, promoters, and/or the like) can be mixed with hard plastics and/or soft plastics that have been separated from the waste stream by the material classification subsystem, and then compressed to form pellets such that the additives are evenly distributed (i.e., substantially homogeneous) and integrated (i.e., bound) within the plastic pellets. In some embodiments, the densified intermediate material can be used as an engineered fuel feed stock in, for example, combustion power plants (e.g., coal burning power plants). In other embodiments, the densified intermediate material can be combined with a second portion of the waste stream (e.g., the soft plastic and/or the fiber) and processed (e.g., compressed). In still other embodiments, the densified intermediate material can be granulated and/or pulverized to any suitable particle size, combined with a second portion of the waste stream and/or additional additives, and then compressed to form a densified engineered fuel feed stock. In this manner, the constituents of the separated waste stream (e.g., the constituents of the waste stream after material classification) can be combined with additives (and/or portions of previously processed materials) to produce a substantially homogeneous engineered fuel feed stock that includes inseparable additives, as described in further detail herein.

Figure 2:
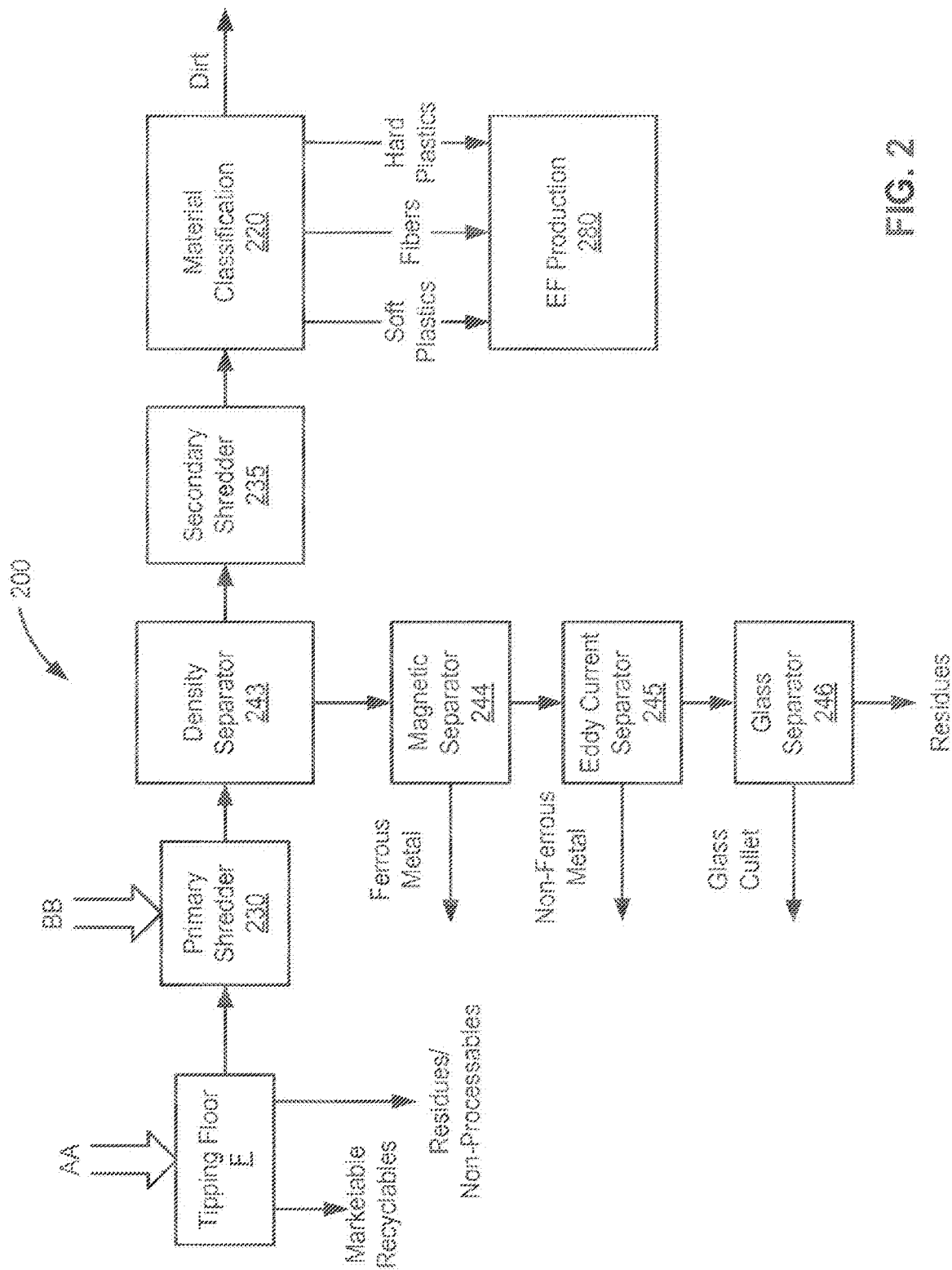
FIG. 2 is a schematic illustration of a system for producing an engineered fuel feed stock from waste material, according to an embodiment.

FIG. 2 is a schematic illustration of a system 200 for producing an engineered fuel feed stock from solid waste material. The system 200 includes at least a tipping floor F, a primary shredder 230, a secondary shredder 235, a density separator 243, a magnetic separator 244, an eddy current separator 245, a glass separator 246, a material classification subsystem 220, and a fuel feed stock production subsystem 280 (also referred to herein as "engineered fuel subsystem 280" or "EF subsystem 280"). In some embodiments, a waste stream is conveyed to the tipping floor F, as shown by arrow AA. The waste stream can be, for example, MSW delivered via a collection truck or recycling residue from a recycling facility. In other embodiments, the solid waste can be delivered via a conveyer from a material recovery facility or other waste handling facility.

The waste stream, at least partially disposed on the tipping floor F, is configured to be separated such that non-processables, prohibitives and/or marketable recyclables (as described above) are removed (e.g., separated) from the waste stream. In some embodiments, the tipping floor is configured to have manual removal of bulky items, screen separators to remove undersized materials such as batteries, electronic parts, food waste, and noncombustibles.

While not shown in FIG. 2, the system 200 can include any number of conveyers and/or transport mechanisms configured to convey at least a portion of the waste stream from a portion of the system 200 to a second portion of the system 200. In this manner and with the non-processables, prohibitives and the marketable recyclables removed from the waste stream, the waste stream can be conveyed to the primary shredder 230. In some embodiments, the primary shredder 230 can be further configured to receive recycling residue, as shown by the arrow BB in FIG. 2. For example, in some embodiments, the primary shredder 230 can receive the waste stream conveyed from the tipping floor F and recycling residue delivered from, for example, a material recovery facility.

The primary shredder 230 can be any suitable shredder configured to reduce the size of the constituents of the waste stream to a suitable size. For example, in some embodiments, the constituents of the waste stream can be reduced to a size less than about 10-12 inches. In other embodiments, the shredder can be configured to reduce the size of the constituents of the waste stream to be less than 4 inches, and in still other embodiments the shredder can be configured to reduce the size of the constituents of the waste stream to be between about 0.75 inches and about 1 inch.

The system 200 can further include a conveyer configured to transfer a portion of the waste stream from the primary shredder 230 to the density separator 243. The conveying of the material can be pneumatically (via air blower) or mechanically (e.g. screw conveyor). The density separator 243 can be configured such that a first set of constituents of the waste stream with a density below a predetermined density threshold (e.g., plastics and/or fibers) pass through the density separator 243 to the secondary shredder 235. A second set of constituents of the waste stream with a density above the predetermined density threshold (e.g., ferrous metals, non-ferrous metals, glass, dirt, and/or the like) are configured to pass through the density separator 243 to additional separations processes. For example, the metals, glass, dirt, etc. can be conveyed to the magnetic separator 244 where the marketable ferrous metals (e.g., steel) are recovered. The remaining metals, glass, dirt, etc. can be conveyed to the eddy current separator 245 where the marketable non-ferrous metals (e.g., aluminum) are recovered. The residual non-metallic material can then optionally be conveyed to the glass separator 246 to remove the glass particles. In some embodiments, the glass separator 246 is an optical glass separator. In other embodiments, the glass separator 246 can be any suitable separator. With the portion of the waste stream substantially free of metals and/or glass, the remaining constituents (e.g., residues) can be disposed of in, for example, a landfill, if no other beneficial use of the material can be identified. In some embodiments where recycled glass does not have a market value, the glass separator can be omitted and/or bypassed and the glass can be disposed of with the residues at a landfill, or used as daily cover material in landfill.

As described above, the first set of constituents of the waste stream (e.g., the plastics and fibers with a density below the density threshold of the density separator 243) are conveyed to the secondary shredder 235. The secondary shredder 235 can be any suitable shredder. For example, in some embodiments, the secondary shredder 235 is substantially similar to the primary shredder 230. In other embodiments, the secondary shredder 235 is different from the primary shredder 235. Furthermore, the secondary shredder 235 can be configured to shred the constituents of the waste stream to any suitable size, e.g. a smaller size than produced by the primary shredder 235. For example, in some embodiments, the secondary shredder is configured to shred the constituents to a size between about 0.375 (⅜") inches and about 0.25 (¼") inches. In other embodiments, the secondary shredder 235 can shred the constituents of the waste stream to a size less than or equal to about 0.09375 (3/32") inches.

In some embodiments, the density separator 243 can be configured to include multiple stages and/or portions. For example, in some embodiments, the waste stream can be delivered to a screen included in the density separator 243. In such embodiments, the screen can define a predetermined mesh size and can be configured to separate the waste stream into a first portion including a constituent size of less than the mesh size and a second portion including a constituent size greater than mesh size. In some embodiments, the first portion of the waste stream can be delivered to a first density separator (not shown) and the second portion of the waste stream can be delivered to a second density separator (not shown). In some embodiments, for example, the screen can define a mesh size of about 0.25 inches. In some embodiments, the separation of the waste stream into the first portion, having the first constituent size, and the second portion, having the second constituent size, can increase the efficiency of the first density separator and/or the second separator. In such embodiments, constituents of greater size can, for example, reduce the efficiency of the first separator, cause the first separator to malfunction, and/or cause the first separator inadequately separate the constituents. With the constituents separated by the first density separator or the second density separator, the constituents with a density greater than the density threshold (e.g., ferrous metals, non-ferrous metals, glass, dirt, and/or the like) are conveyed to the set of separators, as described above. Furthermore, the constituents of the waste stream with a density below the density threshold of the first density separator and/or the second density separator (e.g., the plastics and fibers) can be conveyed to the secondary shredder 235.

In some embodiments, the waste stream can be conveyed from the secondary shredder 235 to an additional density separator configured to separate the constituents of the waste stream, as described above. In such embodiments, the additional density separator can be used to ensure the waste stream is substantially free from metals, glass, and/or any other material that can, for example, have adverse effects on the material classification subsystem 220. With the size of the constituents of the waste stream reduced to a predetermined size and the waste stream sufficiently separated, the waste stream can be transferred to the material classification subsystem 220.

The material classification subsystem 220 can be any suitable system configured to further separate (e.g., classify) a desired set of material. For example, in some embodiments, the material classification subsystem 220 receives the portion of the waste stream having a density below the density threshold of the density separator 243 (e.g., plastics and fibers). In such embodiments, the material classification subsystem 220 can separate the incoming material into, for example, hard plastic, soft plastic, and/or fiber via any suitable method. In some embodiments, the material classification subsystem 220 can include cyclonic separators, fluidized beds, density separators, and/or the like. In this manner, the material classification subsystem 220 can separate the waste stream and store the separated constituents in, for example, bunkers (not shown in FIG. 2).

The system 200 can further include a delivery mechanism (e.g., a conveyer) to convey the hard plastic, the soft plastic, and/or the fiber to the fuel feed stock production subsystem 280. The EF subsystem 280 can be any suitable system. For example, in some embodiments, the EF subsystem 280 can include a portion configured to deliver additives to the waste stream (e.g., chemical additives, sorbents, biomass, biomaterials, and/or the like), a milling portion, an extrusion portion, and/or any other suitable portion.

Expanding further, in some embodiments, the portion of the waste stream (e.g., the hard plastic, soft plastic, and/or fiber) can be mixed with the additives and compressed to form, for example, a densified intermediate material, as described above. In this manner, the constituents of the separated waste stream (e.g., the constituents of the waste stream conveyed from the material classification subsystem 220) can be combined with additives and/or portions of processed materials and processed to produce an engineered fuel feed stock, as described in further detail herein.

Figure 3:
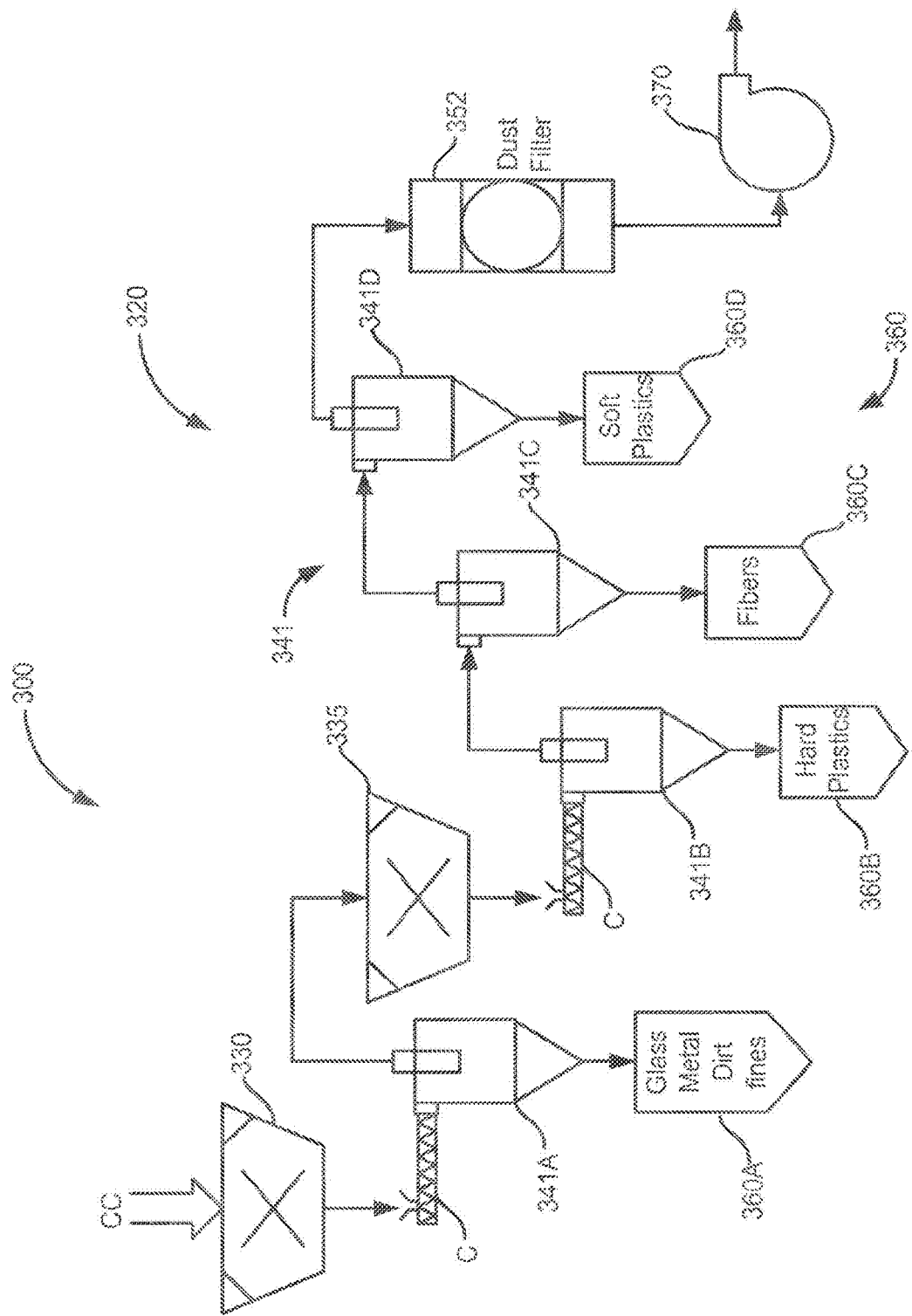
FIG. 3 is a schematic illustration of a material classification subsystem included in the system illustrated in FIG. 2, according to an embodiment.

While the primary shredder 230 described with respect to FIG. 2 is shown receiving both municipal solid waste and recycling residue, in some embodiments, a primary shredder can be configured to receive only recycling residue. For example, as shown in FIG. 3, a system 300 includes at least a primary shredder 330, a material classification subsystem 320, and a set of conveyers C. The primary shredder 330 can be any suitable shredder or shredders. For example, in some embodiments, the primary shredder 330 can be substantially similar to the primary shredder 230 described above with respect to FIG. 2. In some embodiments, the material classification subsystem 320 can further include a secondary shredder 335, a set of cyclonic separators 341, a set of bunkers 360, a dust filter 352, and a blower 370. The set of cyclonic separators 341 can be any suitable cyclonic separators. For example, the cyclonic separators 341 can be configured such that a gas (e.g., air) flows within the cyclonic separator 341 in a helical manner. The cyclonic separators 341 can further be configured such that the flow rate of the air, within the cyclonic separators, separates materials based on a predetermined density threshold, as described in further detail herein.

The primary shredder 330 can be configured to receive recycling residue, as shown by the arrow CC in FIG. 3. With the system 300 receiving recycling residue, the use of multiple separation devices for removing undesired materials from the waste stream (e.g., a magnetic separator, an eddy current separator, and/or a glass separator) can be reduced to using the material classification subsystem 320, as shown in FIG. 3. Similarly stated, since the waste stream is substantially limited to recycling residue, the need for certain separators (e.g., the magnetic separator, the eddy current separator, and/or the glass separator) is reduced or eliminated because the waste stream includes a limited amount of constituents separated by those separators. Said yet another way, the waste stream of the system 300 is sufficiently free from non-processables (e.g., metals, glass, dirt, and/or the like) that the material classification subsystem 320 can be employed to substantially remove the undesirable material and/or classify the waste stream.

In this manner, a first conveyer C can be configured to convey the shredded material (e.g., the waste stream shredded to a size of about 0.375 inches) to the material classification subsystem 320. More specifically, the first conveyer C can be configured to convey the shredded material to a first cyclonic separator 341A to remove, for example, glass, metal, and/or dirt fines. Expanding further, the first cyclonic separator 341A can define a flow rate such that a portion of the waste stream (e.g., glass, metals, and/or dirt fines) is sufficiently dense to fall through the first cyclonic separator 341A and into a first bunker 360A. Conversely, a second portion of the waste stream (e.g., plastics and/or fibers) has a sufficiently lower density such that it is entrained in the air flow of the first cyclonic separator 341A. In this manner, the second portion of the waste stream is transferred from the first cyclonic separator 341A to the secondary shredder 335.

The secondary shredder 335 can be configured to shred the constituents of the waste stream to any suitable size, as described above. With the size of the constituents of the waste stream reduced, the waste stream can be delivered via a second conveyer C to a second cyclonic separator 341B. The second cyclonic separator 341B can be substantially similar in form and function to the first cyclonic separator 341A. However, in some embodiments, the flow rate of the second cyclonic separator 341B can be such that the second cyclonic separator 341B is configured to separate hard plastic material from the waste stream. Similarly stated, in some embodiments, hard plastics in the waste stream have a density that is sufficiently higher than the other components of the waste stream so that the hard plastics fall to the bottom of the second cyclonic separator 341B and are stored in a second bunker 360B. Furthermore, the portion of the waste stream (e.g., soft plastics and/or fibers) having a lower density remains entrained in the air flow of the second cyclonic separator 341B and is transferred from the second cyclonic separator 341B to a third cyclonic separator 341C.

The third cyclonic separator 341C can be substantially similar in form and function to the first cyclonic separator 341A and/or the second cyclonic separator 341B. However, in some embodiments, the flow rate of the third cyclonic separator 341C can be such that the third cyclonic separator 341C is configured to separate fibers (e.g., papers and/or the like) from the waste stream. Similarly stated, in some embodiments, fibers in the waste stream have a density that is sufficiently higher than the other components of the waste stream so that the fibers fall to the bottom of the third cyclonic separator 341C and are stored in a third bunker 360C. Furthermore, the portion of the waste stream (e.g., soft plastics) having a lower density remains entrained in the air flow of the third cyclonic separator 341C and is transferred from the third cyclonic separator 341C to a fourth cyclonic separator 341D.

The fourth cyclonic separator 341D can be substantially similar in form and function to the cyclonic separators 341A, 341B, and/or 341C. However, in some embodiments, the flow rate of the fourth cyclonic separator 341D can be such that soft plastics are separated from the waste stream. Similarly stated, in some embodiments, soft plastics in the waste stream have a density that is sufficiently higher than the other components of the waste stream so that the soft plastics fall to the bottom of the fourth cyclonic separator 341D and are stored in a fourth bunker 360D. Furthermore, the portion of the waste stream (e.g., dust particles) having a lower density remains entrained in the air flow of the fourth cyclonic separator 341D and is transferred from the fourth cyclonic separator 341D to the dust filter 352, configured to substantially remove dust particles from the air. With the air substantially free of dust, the air can be delivered to the blower 370. In some embodiments, the blower 370 is configured to feed a portion of the air to the first, second, third, and/or fourth cyclonic separator 341A, 341B, 341C, 341D, respectively. In other embodiments, the blower 370 can be configured to vent the air, for example, to the atmosphere.

Figure 4:
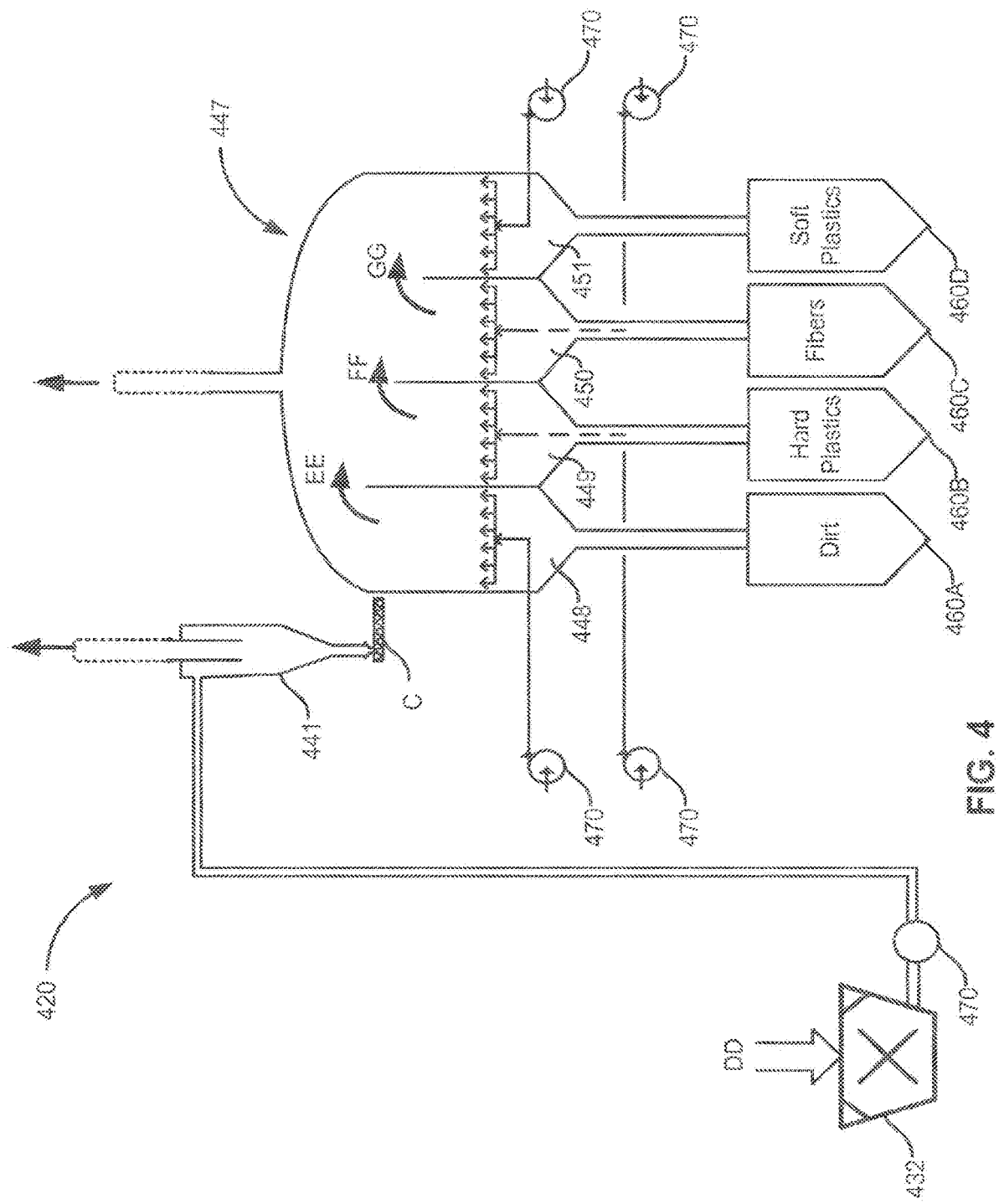
FIG. 4 is a schematic illustration of a material classification subsystem included in the system illustrated in FIG. 2, according to an embodiment.

While the material classification subsystem 320 is described as including cyclonic separators 341, in some embodiments, a material classification subsystem can include any suitable separator and/or combination of separators. For example, as shown in FIG. 4, a material classification subsystem 420 includes a cyclonic separator 441 and a fluidized bed separator 447. Expanding further, the material classification subsystem 420 includes a granulator 432 configured to receive a waste stream, as shown by the arrow DD. In some embodiments, the waste stream can be recycling residue. In other embodiments, the waste stream can be a portion of a municipal solid waste stream (e.g., MSW substantially free from metals, glass, and/or any other non-processables or marketable recyclables).

The granulator 432 can be configured to reduce the size of the constituents of the waste stream. In some embodiments, the granulator 432 is configured to shred the constituents of the waste stream to a size between about 0.375 inches and about 0.25 inches. In other embodiments, the granulator 432 can shred the constituents of the waste stream to a size less than or equal to about 0.09375 inches. With the size of the constituents of the waste stream reduced, the shredded waste stream can be delivered to the cyclonic separator 441. More specifically, the material classification subsystem 420 can include a blower 470 configured to transport the shredded waste stream from the granulator 432 to the cyclonic separator 441. In some embodiments, the waste stream can be conveyed through a tube, shaft, a channel, a pipe, a duct, or the like.

In some embodiments, the cyclonic separator 441 can be substantially similar in form and function as the cyclonic separators 341 described above with respect to FIG. 3. In some embodiments, the cyclonic separator 441 can define a flow rate such that a portion of the waste stream (e.g., dirt, hard plastic, fiber, and soft plastic) is sufficiently dense to pass through the cyclonic separator 441 to a conveyer C. Said another way, the flow rate of the cyclonic separator 441 can be such that fine particles (e.g., dust and/or powders) of the waste stream have a sufficiently low density to remain entrained in the air flow of the cyclonic separator 441. In other embodiments, the cyclonic separator 441 can be configured to remove or separate any suitable constituent from the waste stream.

As described above, portions of the waste stream can pass through the cyclonic separator 441 to the conveyer C. The portions of the waste stream include, for example, dirt, hard plastic, fiber, and soft plastic. The conveyer C receives the portion of the waste stream and is configured to deliver the portion of the waste stream to the fluidized bed 447, as shown in FIG. 4. The fluidized bed 447 includes a first chamber 448, a second chamber, 449, a third chamber 450, and a fourth chamber 451. In some embodiments, the fluidized bed 447 can be configured to separate portions of the waste stream via a separation fluid (e.g., air). Expanding further, the fluidized bed 447 can include a predetermined flow rate and/or flow volume to separate the constituents of the waste stream based on density. Similarly stated, with the constituents of the waste stream reduced (e.g., by the granulator 432) to a substantially uniform size, the separation of the waste stream into a first portion entrained in the air flow of the fluidized bed 447 and a second portion not entrained in the air flow of the fluidized bed 447 can be based on the density of the constituents. In some embodiments, the feed rate of the constituents into the fluidized bed 447 and/or the flow rate of the air can be controlled within a predetermined range such that the fluidized bed 447 can separate the constituents at or about a predetermined density. Thus, the first portion of the waste stream (i.e., the portion entrained in the air flow of the fluidized bed 447) has a density less than the predetermined density and will float to the top of the fluidized bed 447. The second portion (i.e., the portion not entrained in the air flow of the fluidized bed 447) has a density greater than predetermined density and will sink to the bottom of the fluidized bed 447. In this manner, the first chamber 448, the second chamber 449, the third chamber 450, and the fourth chamber 451 of the fluidized bed 447 can be configured to separate the constituents of the waste stream at or about a first predetermined density, a second predetermined density, a third predetermined density, and a fourth predetermined density, respectively.

As shown in FIG. 4, the first chamber 448 of the fluidized bed 447 can be configured to separate dirt from the waste stream. In such embodiments, the first chamber 448 can be configured to separate the constituents of the waste stream at a predetermined separation density range between, for example, between about 25-75 pounds per cubic foot. Therefore, the dirt in the waste stream (e.g., with density between about 75-120 pounds per cubic foot) is sufficiently dense to sink relative to the other constituents of the waste stream and fall to the bottom of the first chamber 448. Furthermore, a first storage bunker 460A can be coupled to the first chamber 448 of the fluidized bed 447 such that the as dirt sinks to the bottom of the first chamber 448, the dirt is stored in the first bunker 460A.

As described above, a portion of the waste stream (e.g., hard plastic, fiber, and/or soft plastic) with a density below the predetermined separation density range of the first chamber 448 of the fluidized bed 447 is configured to float relative to other portions within the first chamber 448. Thus, the arrangement of the fluidized bed 447 can be such that the constituents are transferred to the second chamber 449 of the fluidized bed 447, as shown by the arrow EE in FIG. 4. The second chamber 449 can be configured to separate the constituents of the waste stream at a predetermined separation density range between, for example, the density of the hard plastics and the density of the fibers (e.g., 6-18 pounds per cubic foot). In this manner, the hard plastics in the waste stream (e.g., with density of about 20 pounds per cubic foot) are sufficiently dense to sink relative to the other constituents of the waste stream and fall to the bottom of the second chamber 449. Furthermore, a second storage bunker 460B can be coupled to the second chamber 449 of the fluidized bed 447 such that as the hard plastic sinks to the bottom of the second chamber 449, the hard plastic is stored in the second bunker 460B.

A portion of the waste stream (e.g., fiber and/or soft plastic) with a density below the predetermined separation density range of the second chamber 449 of the fluidized bed 447 is configured to float relative to the other portions within the second chamber 449. Thus, the arrangement of the fluidized bed 447 can be such that the constituents are transferred to the third chamber 450 of the fluidized bed 447, as shown by the arrow FF in FIG. 4. The third chamber 450 can be configured to separate the constituents of the waste stream at a predetermined separation density range between, for example, the density of the fibers and the density of the soft plastics (e.g., about 3 pounds per cubic foot). In this manner, the fibers in the waste stream (e.g., with density of about 4 pounds per cubic foot) are sufficiently dense to sink relative to the other constituents of the waste stream and fall to the bottom of the third chamber 450. Furthermore, a third storage bunker 460C can be coupled to the third chamber 450 of the fluidized bed 447 such that as the fiber sinks to the bottom of the third chamber 450, the fiber is stored in the third bunker 460C.

A portion of the waste stream (e.g., soft plastic) with a density below the predetermined separation density range of the third chamber 450 of the fluidized bed 447 is configured to float relative to the other portions within the third chamber 450. Thus, the arrangement of the fluidized bed 447 can be such that the constituents are transferred to the fourth chamber 451 of the fluidized bed 447, as shown by the arrow GG in FIG. 4. The fourth chamber 451 can be configured to separate the constituents of the waste stream at a predetermined separation density range below, for example, the density of the soft plastics (e.g., less than 2 pounds per cubic foot). In this manner, the soft plastics in the waste stream (e.g., with density of about 2 pounds per cubic foot) are sufficiently dense to sink relative to the other constituents of the waste stream and fall to the bottom of the fourth chamber 451. Furthermore, a fourth storage bunker 460D can be coupled to the fourth chamber 451 of the fluidized bed 447 such that as the soft plastic sinks to the bottom of the fourth chamber 451, the soft plastic is stored in the fourth bunker 460D. The fluidized bed 447 can be further configured to vent excess air to stabilize the pressure within the fluidized bed 447. In some embodiments, the air can be circulated back to the blowers 470. In other embodiments, the air is vented to the atmosphere.

In some embodiments, the dirt stored in the first bunker 460A is conveyed to a disposal system. The disposal system can be, for example, transporting the dirt to a landfill. In other embodiments, the dirt can be processed (e.g., cleaned) and sold. In some embodiments, the hard plastic stored in the second bunker 460B, the fiber stored in the third bunker 460C, and the soft plastic stored in the fourth bunker 460D are delivered to a fuel feed stock production system, such as, for example, those described herein. Engineered fuel feed stocks are described in U.S. Pat. Nos. 8,157,874 and 8,157,875 to Bohlig et al., filed Apr. 14, 2011, entitled "Engineered Fuel Feed Stock," the disclosures of which are hereby incorporated herein by reference, in their entireties.

Figure 5:
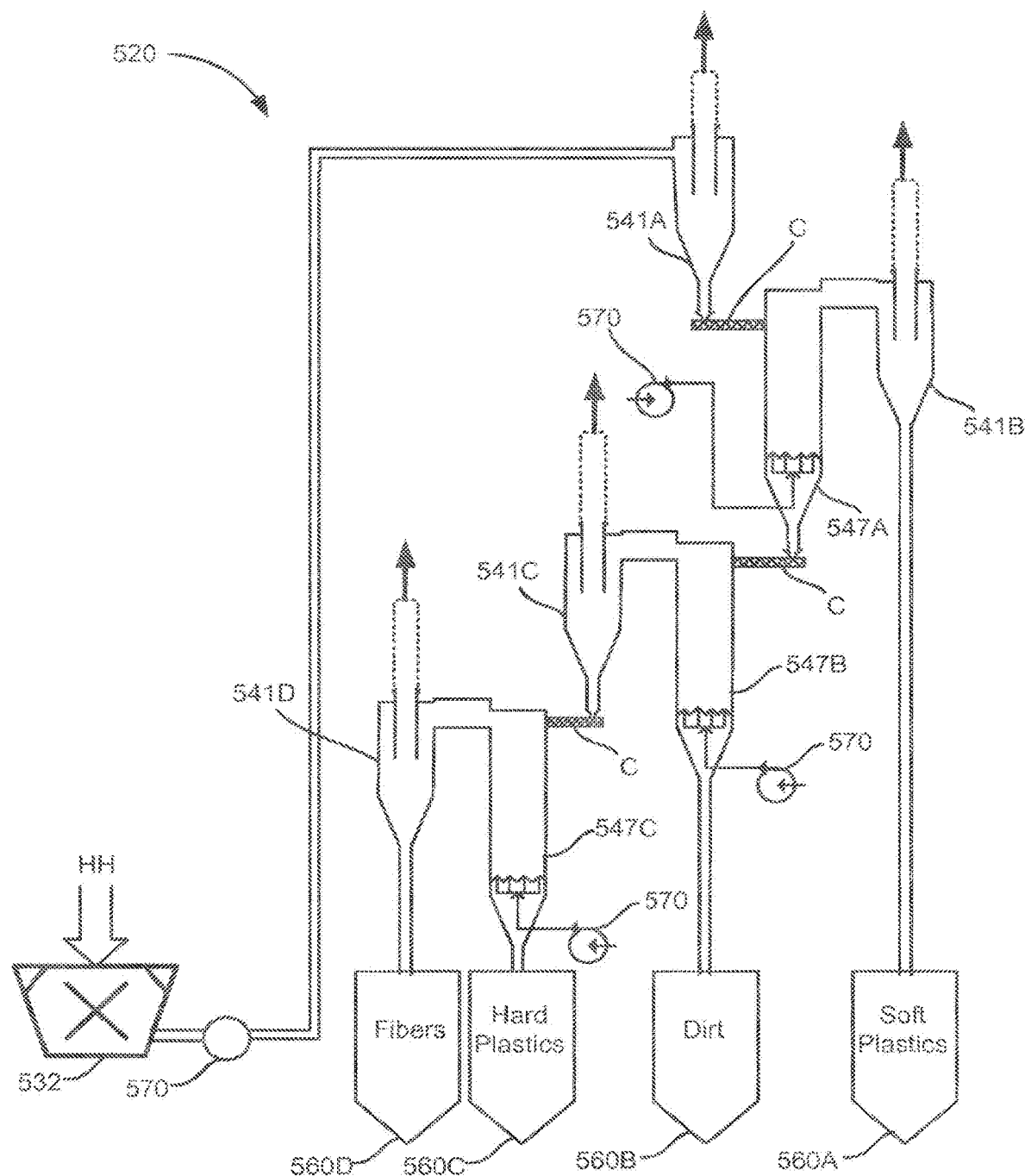
FIG. 5 is a schematic illustration of a material classification subsystem included in the system illustrated in FIG. 2, according to an embodiment.

Referring now to FIG. 5, in some embodiments, a material classification subsystem 520 includes a first, second, third, and fourth cyclonic separator (541A, 541B, 541C, and 541D, respectively) and a first, second, and third, fluidized bed separator (547A, 547B, 547C, respectively). The material classification subsystem 520 further includes a granulator 532 configured to receive a waste stream, as shown by the arrow HH. In some embodiments, the waste stream can be recycling residue. In other embodiments, the waste stream can be a portion of a municipal solid waste stream (e.g., MSW substantially free from metals, glass, and/or any other undesired material).

The granulator 532 can be configured to reduce the size of the constituents of the waste stream, as described above with respect to FIG. 4. With the size of the constituents of the waste stream reduced, the shredded waste stream can be delivered to the first cyclonic separator 541A. More specifically, the material classification subsystem 520 can include a blower 570 configured to transport the shredded waste stream from the granulator 532 to the first cyclonic separator 541A. In some embodiments, the waste stream can be conveyed through a tube, shaft, a channel, a pipe, or the like.

In some embodiments, the first cyclonic separator 541A can be substantially similar in form and function as the cyclonic separators 441 described above with respect to FIG. 4. In some embodiments, the first cyclonic separator 541A can define a flow rate such that a portion of the waste stream (e.g., dirt, hard plastic, fiber, and soft plastic) is sufficiently dense to fall through the first cyclonic separator 541A to a conveyer C. Said another way, the flow rate of the first cyclonic separator 541A can be such that fine particles (e.g., dust and/or powders) of the waste stream have a sufficiently low density to remain entrained in the air flow of the first cyclonic separator 541A. In other embodiments, the first cyclonic separator 541A can be configured to remove or separate any suitable constituent from the waste stream.

As described above with respect to FIG. 4, portions of the waste stream pass through the first cyclonic separator 541A to the conveyer C. In some embodiments, the portion of the waste stream can include dirt with a density between about 75-120 pounds per cubic foot, hard plastics with a density of about 20 pounds per cubic foot, fibers with a density of about 4 pounds per cubic foot, and soft plastics with a density of about 2 pounds per cubic foot. The conveyer C receives the portion of the waste stream and is configured to deliver the portion of the waste stream to the first fluidized bed 547A, as shown in FIG. 5. The fluidized beds 547, as described herein, can be substantially similar in function to the fluidized bed 447 described with respect to FIG. 4. Therefore, functional details of the fluidized beds 547 are not described in further detail.

The first fluidized bed 547A can be configured to separate the soft plastics (and constituents with densities less than that of soft plastics such as, for example, dust or powders) from the waste stream. In such embodiments, the first fluidized bed 547A can be configured to separate the constituents of the waste stream at a predetermined separation density range between, for example, the density of the fibers and the density of the soft plastics (e.g., about 3 pounds per cubic foot). In this manner, the soft plastics (e.g., with density of about 2 pounds per cubic foot) are not sufficiently dense to sink relative to the first fluidized bed 547A. Thus, the soft plastics (and any other constituent with a density less the density of soft plastics) float or entrain relative to the other constituents within the first fluidized bed 547A and are transported to a second cyclonic separator 541B. The second cyclonic separator 541B can include a flow rate defining a density threshold configured to separate the soft plastic from the other constituents. Similarly stated, the soft plastic is sufficiently dense to fall to the bottom of the second cyclonic separator 541B and into a first storage bunker 560A. Furthermore, constituents with a density less than the density threshold are entrained in the air flow and can be suitably disposed of.

Referring back to the first fluidized bed 547A, the constituents with densities greater than the predetermined density range of the first fluidized bed 547A sink to the bottom of the first fluidized bed 547A and are delivered to a conveyer C. The conveyer C is configured to deliver the constituents of the waste stream to the second fluidized bed 547B. The second fluidized bed 547B can be configured to separate the constituents of the waste stream at a predetermined separation density range between, for example, about 25-70 pounds per cubic foot. Therefore, the dirt (e.g., with density between about 75-120 pounds per cubic foot) is sufficiently dense to sink relative to the other constituents of the waste stream and fall to the bottom of the second fluidized bed 547B. Furthermore, a second storage bunker 560B can be coupled to the second fluidized bed 547B such that as the dirt sinks to the bottom of the second fluidized bed 547B, the dirt is stored in the second bunker 560B.

A portion of the waste stream with a density below the predetermined density range of the second fluidized bed 547B is configured to float relative to the other portions of the second fluidized bed 547B. Thus, the arrangement of the second fluidized bed 547B can be such that the constituents are transferred to the third cyclonic separator 541C. The third cyclonic separator 541C can include a flow rate defining a density threshold configured to separate the hard plastics and the fiber from the other constituents. Similarly stated, the hard plastics and the fibers are sufficiently dense to fall to the bottom of the third cyclonic separator and are delivered to a conveyer C.

The third fluidized bed 547C can be configured to separate the constituents of the waste stream at a predetermined separation density range between, for example, the density of the hard plastics and the density of the fibers (e.g., about 6-18 pounds per cubic foot. In this manner, the hard plastics (e.g., with density of about 20 pounds per cubic foot) are sufficiently dense to sink relative to the other constituents of the waste stream and fall to the bottom of the third fluidized bed 547C. Furthermore, a third storage bunker 560C can be coupled to the third fluidized bed 547C such that as the hard plastics sink to the bottom of the third fluidized bed 547C, the hard plastics are stored in the third bunker 560C.

A portion of the waste stream with a density below the predetermined density range of the third fluidized bed 547C is configured to float relative to the other portions of the third fluidized bed 547C. Thus, the arrangement of the third fluidized bed 547C can be such that the constituents are transferred to the fourth cyclonic separator 541D. The fourth cyclonic separator 541D can include a flow rate defining a density threshold configured to separate the fibers (e.g., with density of about 4 pounds per cubic foot) from the other constituents. Similarly stated, the fibers are sufficiently dense to fall to the bottom of the fourth cyclonic separator and into a fourth storage bunker 560D. Furthermore, constituents with a density less than the density threshold are entrained in the air flow and can be suitably disposed of.

In some embodiments, the dirt stored in the second bunker 560B is transferred to a disposal system. The disposal system can be, for example, transporting the dirt to a landfill. In other embodiments, the dirt can be processed (e.g., cleaned) and sold. In some embodiments, the soft plastics stored in the first bunker 560A, the hard plastics stored in the third bunker 560C, and the fibers stored in the fourth bunker 560D are delivered to a fuel feed stock production system, such as, for example, those described herein. In some embodiments, the passage of the waste stream through cyclonic separators 541 before entering the fluidized beds 547 can result in cleaner constituents stored in the bunkers 560.

Figure 6:
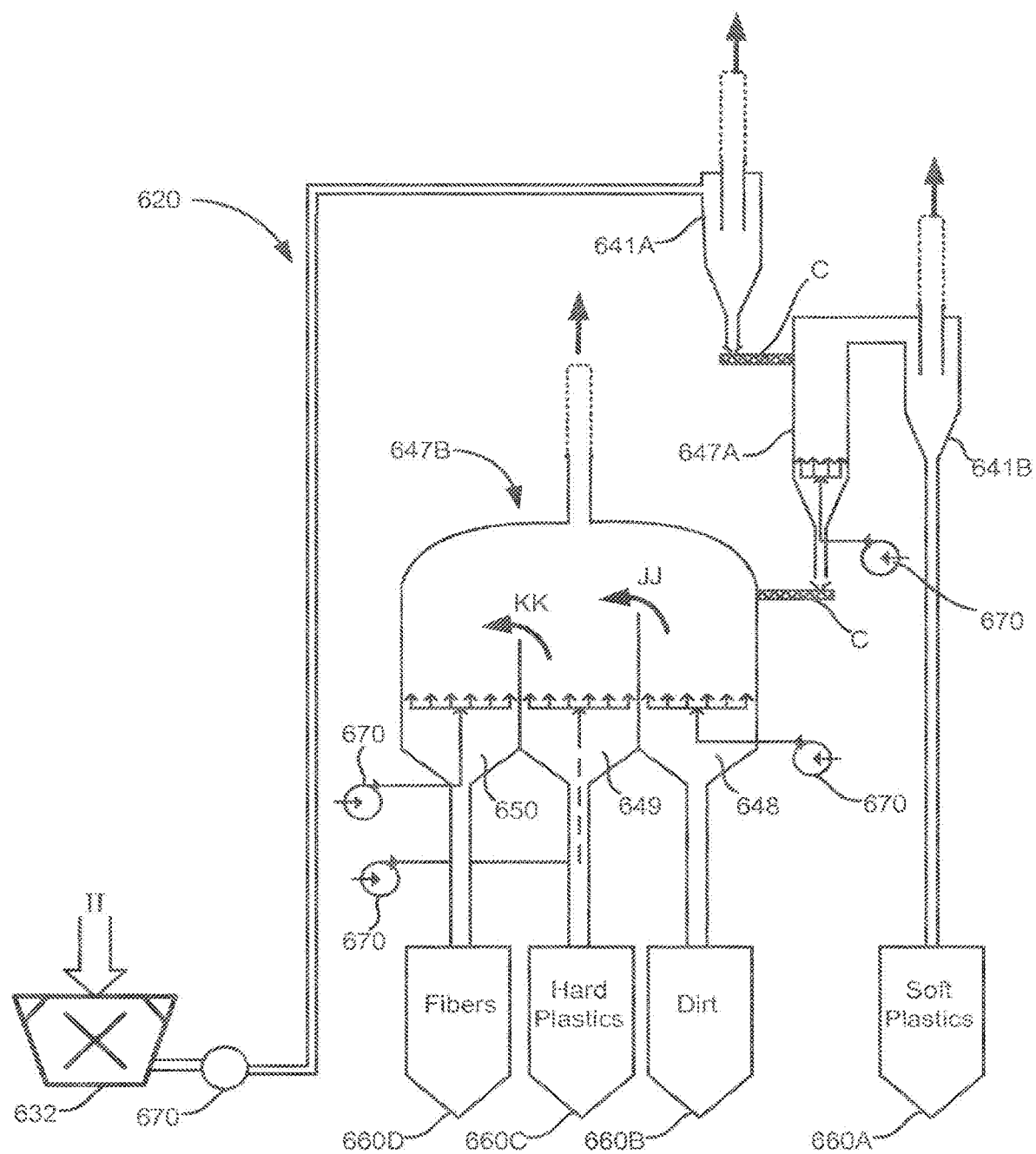
FIG. 6 is a schematic illustration of a material classification subsystem included in the system illustrated in FIG. 2, according to an embodiment.

Referring now to FIG. 6, in some embodiments, a material classification subsystem 620 includes a first and second cyclonic separator (641A, 641B, respectively) and a first and second fluidized bed separator (647A, 647B, respectively). The material classification subsystem 620 further includes a granulator 632 configured to receive a waste stream, as shown by the arrow II. In some embodiments, the waste stream can be recycling residue. In other embodiments, the waste stream can be a portion of a municipal solid waste stream (e.g., MSW substantially free from metals, glass, and/or any other undesired material).

The granulator 632 can be configured to reduce the size of the constituents of the waste stream, as described above with respect to FIGS. 4 and 5. With the size of the constituents of the waste stream reduced, the shredded waste stream can be delivered to the first cyclonic separator 641A. More specifically, the material classification subsystem 620 can include a blower 670 configured to transport the shredded waste stream from the granulator 632 to the first cyclonic separator 641A. In some embodiments, the waste stream can be conveyed through a tube, shaft, a channel, a pipe, or the like.

In some embodiments, the first cyclonic separator 641A can be substantially similar in form and function as the first cyclonic separator 541A described above with respect to FIG. 5. In some embodiments, the first cyclonic separator 641A can define a flow rate such that a portion of the waste stream (e.g., dirt, hard plastic, fiber, and soft plastic) is sufficiently dense to pass through the first cyclonic separator (e.g., fall to the bottom of the first cyclonic separator 641A) to a conveyer C. Said another way, the flow rate of the first cyclonic separator 641A can be such that fine particles (e.g., dust and/or powders) of the waste stream have a sufficiently low density to remain entrained in the air flow of the first cyclonic separator 641A. In other embodiments, the first cyclonic separator 641A can be configured to remove or separate any suitable constituent from the waste stream.

The portions of the waste stream that pass through the first cyclonic separator 641A can be delivered to the conveyer C. In some embodiments, the portion of the waste stream can include dirt with a density between about 75-120 pounds per cubic foot, hard plastics with a density of about 20 pounds per cubic foot, fibers with a density of about 4 pounds per cubic foot, and soft plastics with a density of about 2 pounds per cubic foot. The conveyer C receives the portion of the waste stream and is configured to deliver the portion of the waste stream to the first fluidized bed 647A, as shown in FIG. 6. The fluidized beds 647, as described herein, can be substantially similar in function to the fluidized bed 447 described with respect to FIG. 4. Therefore, functional details of the fluidized beds 647 are not described in further detail.

The first fluidized bed 647A can be configured to separate the soft plastics (and constituents with densities less than that of soft plastics such as, for example, dust or powders) from the waste stream. In such embodiments, the first fluidized bed 647A can be configured to separate the constituents of the waste stream at a predetermined separation density range between, for example, the density of the fibers and the density of the soft plastics (e.g., about 3 pounds per cubic foot). In this manner, the soft plastics (e.g., with density of about 2 pounds per cubic foot) are not sufficiently dense to sink relative to the first fluidized bed 647A. Thus, the soft plastics (and any other constituent with a density less the density of soft plastics) float relative to the other constituents within the first fluidized bed 647A and are transported to a second cyclonic separator 641B. The second cyclonic separator 641B can include a flow rate defining a density threshold configured to separate the soft plastic from the other constituents. Similarly stated, the soft plastic is sufficiently dense to fall to the bottom of the second cyclonic separator 641B and into a first storage bunker 660A. Furthermore, constituents with a density less than the density threshold are entrained in the air flow and can be suitably disposed of.

Referring back to the first fluidized bed 647A, the constituents with densities greater than the predetermined separation density of the first fluidized bed 647A sink to the bottom of the first fluidized bed 647A and are delivered to a conveyer C. The conveyer C is configured to deliver the constituents of the waste stream to the second fluidized bed 647B. As shown in FIG. 6, the second fluidized bed 647B include a first chamber 648, a second chamber 649, and a third chamber 650. The first chamber 648 can be configured to separate the constituents of the waste stream at a predetermined separation density range between, for example, about 25-70 pounds per cubic foot. Therefore, the dirt (e.g., with density between about 75-120 pounds per cubic foot) is sufficiently dense to sink relative to the other constituents of the waste stream and fall to the bottom of the first chamber 648. Furthermore, a second storage bunker 660B can be coupled to the first chamber 648 of the fluidized bed 647 such that as the dirt sinks through the first chamber 648, the dirt is stored in the second bunker 660B.

A portion of the waste stream with a density below the predetermined density range of the first chamber 648 of the fluidized bed 647 is configured float relative to the other portions of the waste stream within the first chamber 648. Thus, the arrangement of the fluidized bed 647 can be such that the constituents are transferred to the second chamber 649 of the fluidized bed 647, as shown by the arrow JJ in FIG. 6. The second chamber 649 can be configured to separate the constituents of the waste stream at a predetermined separation density range between, for example, the density of the hard plastics and the density of the fibers (e.g., about 6-18 pounds per cubic foot). In this manner, the hard plastic (e.g., with density of about 20 pounds per cubic foot) is sufficiently dense to sink relative to the other constituents of the waste stream and fall to the bottom of the second chamber 649 of the fluidized bed 647. Furthermore, a third storage bunker 660C can be coupled to the second chamber 649 such that as the hard plastic sinks through the second chamber 649, the hard plastics are stored in the third bunker 660C.

A portion of the waste stream with a density below the predetermined density range of the second chamber 649 of the fluidized bed 647 is configured to float relative to the other portions of the waste stream within the second chamber 648. Thus, the arrangement of the fluidized bed 647 can be such that the constituents are transferred to the third chamber 650 of the fluidized bed 647, as shown by the arrow KK. The third chamber 650 can be configured to separate the constituents of the waste stream at a predetermined separation density range between, for example, the density of the fibers and the density of the soft plastics (e.g., about 3 pounds per cubic foot). In this manner, the fibers (e.g., with density of about 4 pounds per cubic foot) are sufficiently dense to sink relative to the other constituents of the waste stream and fall to the bottom of the third chamber 650 of the fluidized bed 647. Furthermore, a fourth storage bunker 660D can be coupled to the third chamber 650 of the fluidized bed 647 such that as the fibers sink through the third chamber 650, the fibers are stored in the fourth bunker 660D.

Figure 7:
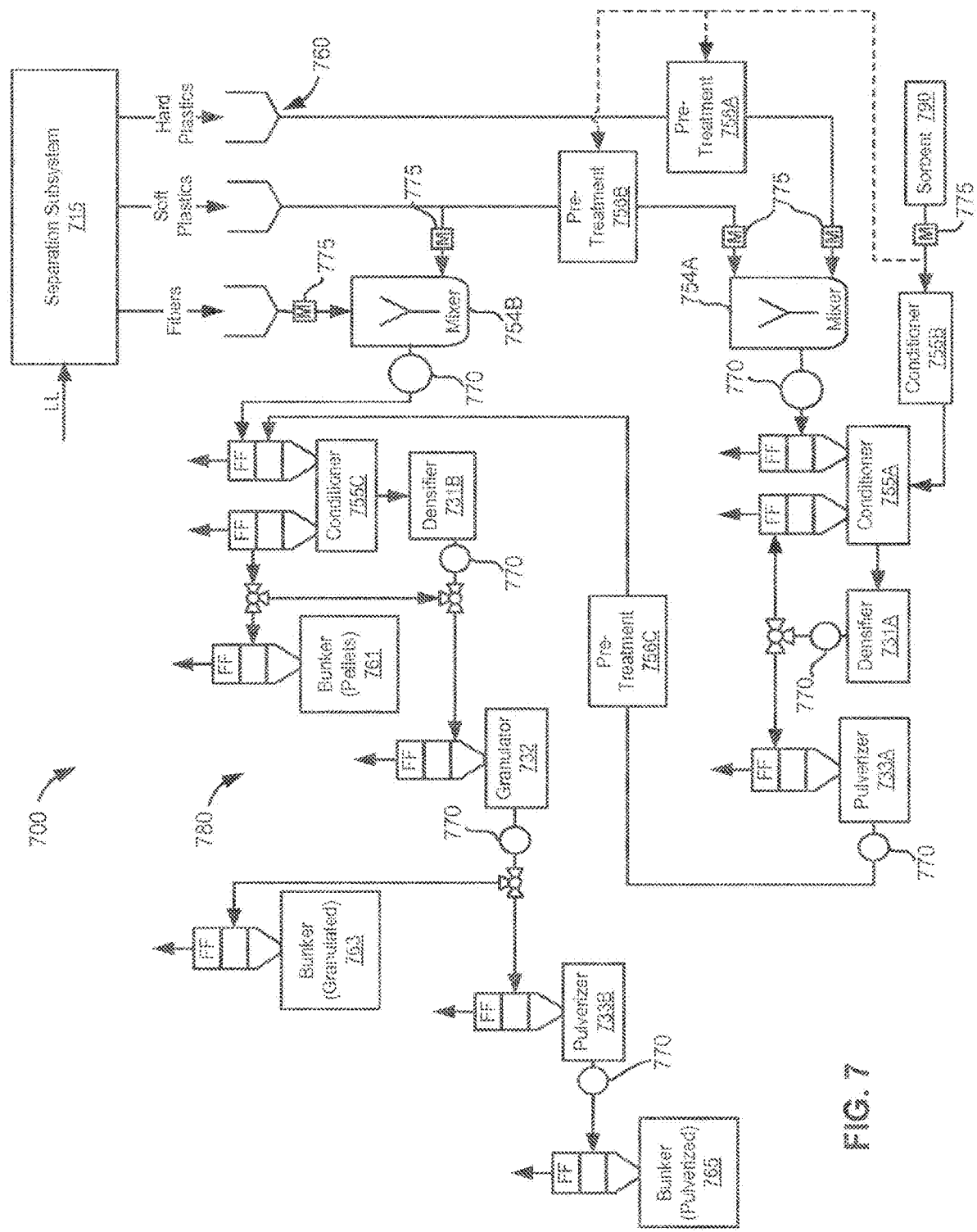
FIG. 7 is a schematic illustration of a system for producing an engineered fuel feed stock from waste material, according to an embodiment.

FIG. 7 is a schematic illustration of a system 700 for producing an engineered fuel feed stock from solid waste material. The system 700 includes at least a separation subsystem 715 and a fuel feed stock production subsystem 780 (also referred to herein as "engineered fuel subsystem 780" or "EF subsystem 780" or "Advanced Product Manufacturing (APM) subsystem 780"). In some embodiments, a waste stream can be transferred to the separation subsystem 715, as shown by arrow LL in FIG. 7. The waste stream can be, for example, MSW delivered via a collection truck or recycling residue from a recycling facility. In other embodiments, the solid waste can be delivered via a conveyer from a material recovery facility or other waste handling facility. The separation subsystem 715 can be configured to separate the waste stream that non-processables and/or marketable recyclables are removed (e.g., separated) from the waste stream. Expanding further, the separation subsystem 715 can be any of the systems described with reference to FIGS. 2-6 or any combination thereof. In some embodiments, the separation subsystem 715 can include any number of separators (e.g., magnetic separators, eddy current separators, glass separators, fluidized bed separators, cyclonic separators, and/or the like), shredders and granulators. In this manner, the separation subsystem 715 can receive a waste stream (e.g., MSW and/or recycling residue) and transfer separated constituents of the waste stream into bunkers 760. For example, in some embodiments, the material classification subsystem 720 can include a first bunker configured to store hard plastics, a second bunker configured to store soft plastics, and a third bunker configured to store fibers. In this manner, the system 700 can further include a delivery mechanism (e.g., a conveyers, tubes, pipes, channels, and/or the like) to convey the hard plastics, the soft plastics, and/or the fibers to the EF subsystem 780.

The EF subsystem 780 can be any suitable system suitable for combining the classified waste materials with additives in predetermined ratios to produce an engineered fuel feed stock. The EF subsystem 780 can include, for example, a portion configured to deliver additives to the waste stream (e.g., chemical additives, sorbents, biomass, biomaterials, and/or the like), conditioners, mixers, conveyers, densifiers, granulators, pulverizers, storage bunkers, and/or any other suitable devices or systems.

In some embodiments, at least a portion of the waste stream can be delivered to the EF subsystem 780 to produce an engineered fuel feed stock. Expanding further, in some embodiments, the material classification subsystem 715 can be configured to deliver a given quantity of the hard plastics to the EF subsystem 780. In such embodiments, the hard plastics can be passed through a pre-treatment mechanism 756. The pre-treatment mechanism 756 can be, for example, a heater configured to raise the temperature of the hard plastics. In some embodiments, the pretreatment mechanism can receive at least a portion of the sorbent 790. In still other embodiments, the soft plastic portion delivered to the mixer 754A can be first directed to the pretreatment mechanism 756. The EF subsystem 780 can further include a set of mixers 754 configured to receive at least a portion of the waste stream delivered by the material classification subsystem 720 and metering devices 775 configured to control the flow of the waste stream into the mixers 754.

The mixers 754 can be any suitable device such as paddled continuous mixer, rotary continuous mixer, screw conveyor or auger conveyor mixer, mechanically vibrating or agitating mixer. In some embodiments, the material classification subsystem 715 can deliver a first waste stream including hard plastics and a second waste stream including soft plastics to a first mixer 754A. In such embodiments, the first mixer 754A is configured to mix a metered amount of the hard plastics with a metered amount of the soft plastics. In this manner, the first mixer 754A can deliver the mixed waste stream to a blower 770 configured to feed the waste stream to a first conditioner 755A. In other embodiments, the hard plastics can be configured to pass through the first mixer 754A and remain substantially unmixed (e.g., the metering mechanism 775 does not supply a quantity of the soft plastics). In this manner, a waste stream including substantially only hard plastics can be delivered to the first conditioner 755A, as further described herein.

The first conditioner 755A can be any suitable device and/or system configured to condition at least a portion of the waste stream for engineered fuel feed stock production. For example, in some embodiments, the first conditioner 755A can be configured to increase the temperature of the constituents of the waste stream (e.g., the hard plastics). In some embodiments, the first conditioner 755A can be configured to increase the moisture of the constituents of the waste stream. In some embodiments, the first conditioner 755A can receive the portion of the waste stream and a set of additives. In some embodiments, the additives can be chemical additives (e.g., sorbents, nutrients, promoters, and/or the like), biomass waste (e.g., wood), biomaterials (e.g., animal manure), and/or any other suitable additive or additives, in solids or solution form (e.g. urea, acetic acid, mercury oxidizing agents such as calcium bromide, ammonium bromide, sodium bromide, etc., for mercury reduction). For example, in some embodiments, the first conditioner 755A can be configured to receive a sorbent 790. In such embodiments, the sorbent 790 can be configured to alter the combustion properties of the constituents of the waste stream. For example, in some embodiments, the sorbent 790 can be configured to absorb sulfur dioxide ($SO_2$). In other embodiments, the sorbent 790 can be configured to absorb and/or neutralize odors, burn with a given color, and/or the like. In some embodiments, the sorbent 790 can be conditioned by a second conditioner 755B prior to being delivered to the first conditioner 755A. In such embodiments, the second conditioner 755B can be configured to, for example, raise the temperature of the sorbent 790. Examples of additives that can be incorporated into the engineered fuel feed stock using the subsystem 780 include sodium sesquicarbonate (Trona), sodium bicarbonate, sodium carbonate, zinc ferrite, zinc copper ferrite, zinc titanate, copper ferrite aluminate, copper aluminate, copper managanese oxide, nickel supported on alumina, zinc oxide, iron oxide, copper, copper (I) oxide, copper (II) oxide, limestone, lime, Fe, FeO, $Fe_2O_3$, $Fe_3O_4$, iron filings, $CaCO_3$, $Ca(OH)_2$, $CaCO_3.MgO$, silica, alumina, china clay, kaolinite, bauxite, emathlite, attapulgite, coal ash, egg shells, organic salts (such as calcium magnesium acetate (CMA), calcium acetate (CA), calcium formate (CF), calcium benzoate (CB), calcium propionate (CP) and magnesium acetate (MA)) and Ca-montmorillonite.

The first conditioner 755A can further be configured to deliver the conditioned waste stream and additives to a first densifier 731A. The first densifier 731A can be any suitable device configured to encapsulate at least a portion of the sorbent 790 within the plastics. For example, in some embodiments, the first densifier 731A can be an extrusion device configured to apply a relatively high pressure (e.g., compress) to the plastics and the sorbent 790 such that the sorbent 790 becomes evenly distributed (e.g., substantially homogenous) and/or encapsulated within the plastics. Furthermore, the first densifier 731A can be configured to produce a densified intermediate material. The densified intermediate material can be in the form of cubes, briquettes, pellets, honeycomb, or other suitable shapes and forms. In some embodiments, the densified intermediate material can be used as an engineered fuel feed stock in, for example, combustion power plants (e.g., coal burning power plants). In other embodiments, the densified intermediate material can be returned to the first conditioner 755A such as to further incorporate the sorbent 790 (e.g., raise the sorbent 790 content and/or rigidity within the pellet). With the desired amount of sorbent 790 encapsulated within the plastics, a blower 770 can deliver the densified intermediate material from the first densifier 731A to a first pulverizer 733A.

The first pulverizer 733A can be any suitable device configured to reduce the densified intermediate material (e.g., pellets) to a relatively fine powder, such as about 3/32" or 1/16". With the densified intermediate material pulverized, a blower 770 can deliver the pulverized material to a third conditioner 755C. In some embodiments, the third conditioner 755C can be substantially similar to the first conditioner 755A. Furthermore, the system 700 includes a second mixer 754B configured to deliver a second waste stream from the material classification subsystem 720. In some embodiments, the second mixer 754B can be configured to mix a portion of soft plastics with a portion of fibers. In other embodiments, the second mixer 754B is configured to only mix soft plastics or fibers with the pulverized material. In this manner, the third conditioner 755C is configured to condition (e.g., heating, humidifying, and adding solutions) the pulverized material and the soft plastics and/or fibers and deliver the conditioned materials to the second densifier 731B.

In some embodiments, the second densifier 731B can be any suitable densifier. In some embodiments, the second densifier 731B can be substantially similar to the first densifier 731A. For example, in some embodiments, the second densifier 731B can be an extrusion device configured to apply a relatively high pressure to the materials such that the pulverized intermediate material (i.e. encapsulated sorbent and plastics) becomes encapsulated in the waste material (e.g., soft plastics, and/or fibers). In this manner, the second densifier 731B can be configured to produce an engineered fuel feed stock. In some embodiments, the fuel feed stock can be returned to the second conditioner 755A such as to further incorporate the soft plastics and/or fibers or increase the pellets rigidity. This recirculation may be especially necessary during the startup process of the production when the densifier is cool. With the desired amount of sorbent 790 encapsulated within the waste material (e.g., hard plastics, soft plastics, and/or fibers) a blower 770 can deliver the fuel feed stock from the second densifier 731B to a first pellet bunker 761. Expanding further, in some embodiments, the second densifier 731B can be configured to densify the material into an engineered fuel pellet. In some embodiments, the engineered fuel pellets can be stored in the first pellet bunker 761.

In some embodiments, it can be desirable to reduce the size of the engineered fuel pellets. In such embodiments, the blower 770 can be configured to deliver the engineered fuel pellets to a granulator 732. In this manner, the granulator 732 can reduce the size of the engineered fuel pellets and produce a granulated fuel feed stock. The granulated fuel feed stock can have an average particle size in the range of about 0.04-0.2 inches for fluidized bed applications and in the range of about 0.2-0.6 inches for circulating bed application. In some embodiments, the granulated fuel feed stock can be delivered to a granulated fuel bunker 763, as shown in FIG. 7. In other embodiments, it can be desirable to further reduce the size of the granulated fuel feed stock. In such embodiments, a blower 770 can deliver the granulated fuel feed stock to a second pulverizer 733B. In this manner, the second pulverizer 733B can reduce the size of the granulated fuel feed stock to a relatively fine fuel stock. The pulverized fuel feed stock can have an average particle size in the range of about 0.004-0.12 inches. Furthermore, a blower 770 can be configured to deliver the fuel stock powder to a powdered fuel bunker 765. Therefore, the system 700 can be configured to produce an engineered fuel feed stock for a variety of conditions (e.g., the pelletized fuel stock, the granulated fuel stock, and/or the pulverized fuel stock).

Figure 8:
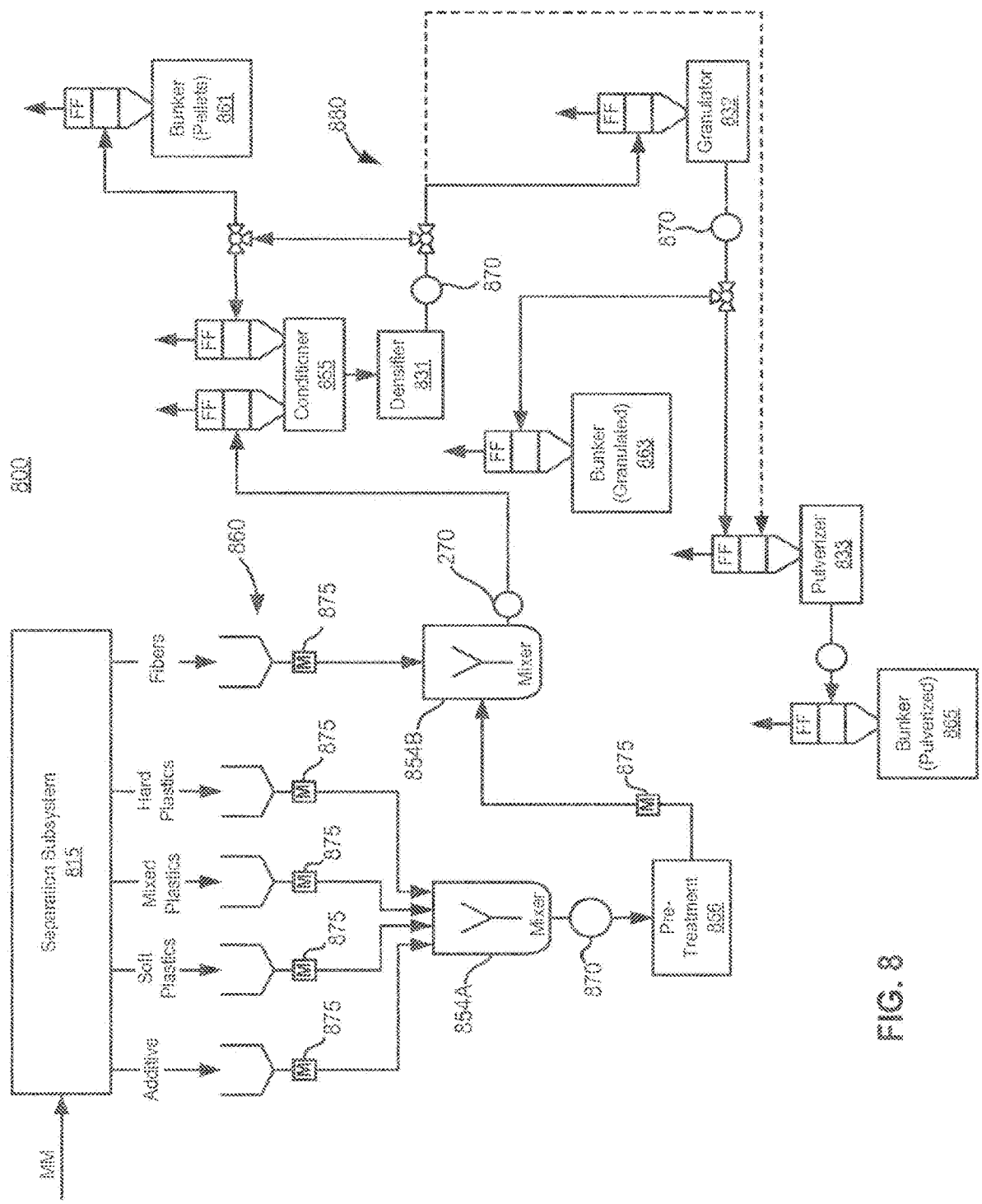
FIG. 8 is a schematic illustration of a system for producing an engineered fuel feed stock from waste material, according to an embodiment.
Figure 9A:
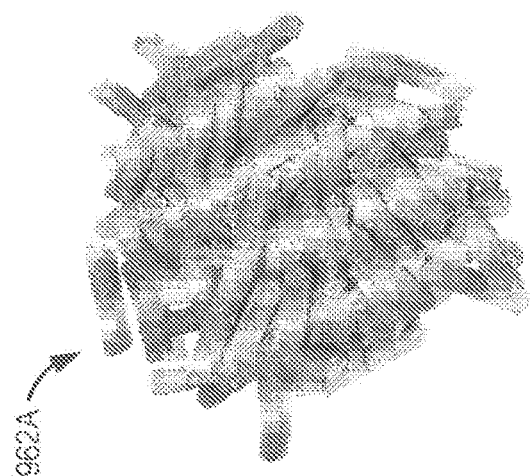
FIGS. 9A-9F are top views of a fuel feed stock in a first, second, third, fourth, fifth, and sixth configuration, respectively, according to an embodiment.
Figure 9B:
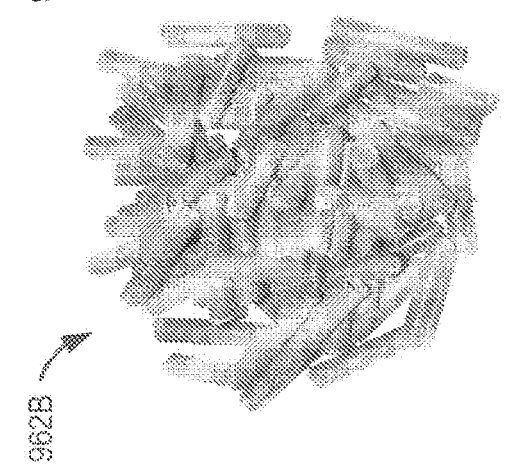
Figure 9C:
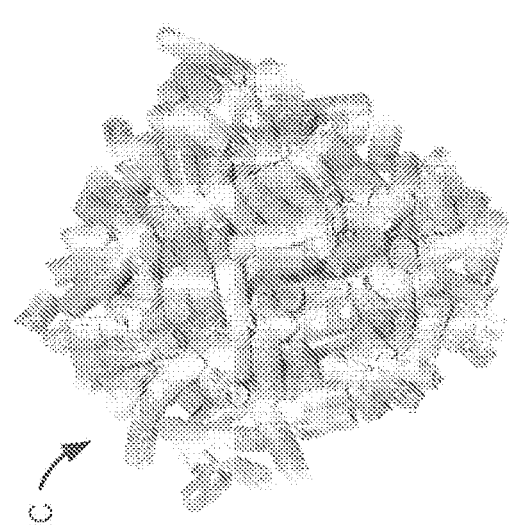
Figure 9D:
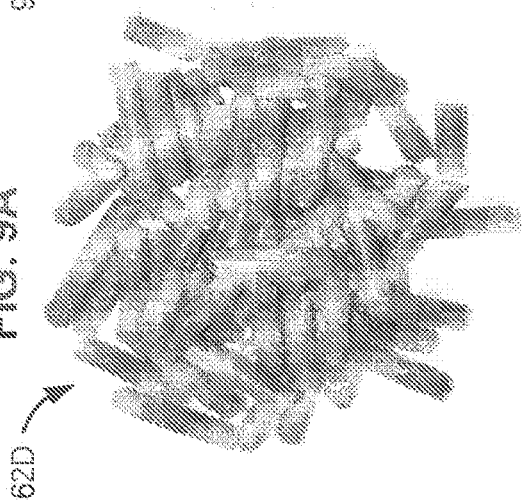
Figure 9E:
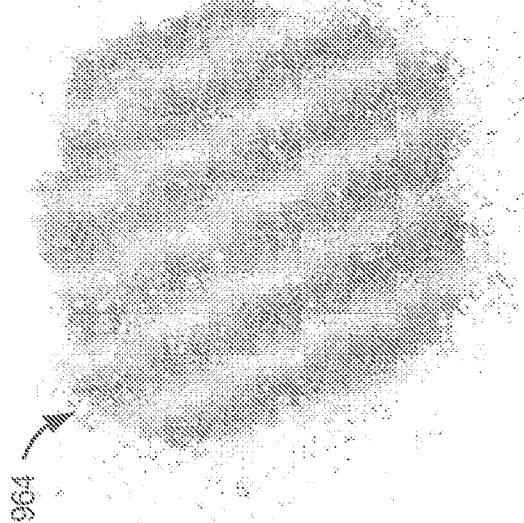
Figure 9F:
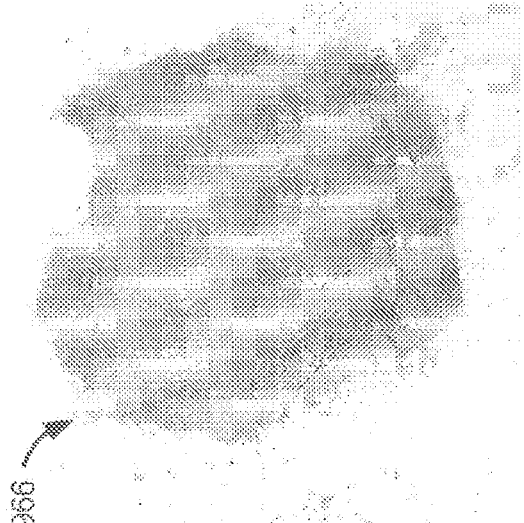

FIG. 8 is a schematic illustration of a system 800 for producing an engineered fuel feed stock from solid waste material. The system 800 includes a separation subsystem 815 and a fuel feed stock production subsystem 880 (also referred to herein as "Advanced Product Manufacturing" (APM) 880). The separation subsystem 815 can be substantially similar to the separation subsystem 715 described above with respect to FIG. 7. Similarly, the APM 880 can include similar components as the APM 780. Therefore, certain components of the APM 880 are not described in detail herein and should be considered substantially similar to the corresponding component of the APM 780 unless explicitly described as different.

As shown in FIG. 8, the separation subsystem 815 can be configured to separate the constituents of a waste stream. In this manner, the separation subsystem 815 can include a set of bunkers configured to store, for example, hard plastics, soft plastics, mixed plastics, fibers, and additives (e.g., any of the additives described above). In this manner, at least a portion of the waste stream can be delivered to the APM subsystem 880 to produce an engineered fuel feed stock. Expanding further, in some embodiments, the separation subsystem 815 can be configured to deliver a given quantity of the hard plastics, soft plastics, mixed plastics, and/or additives to the EF subsystem 880. In such embodiments, the plastics (e.g., the hard and soft plastics) and the additives are passed through metering devices 875 configured to control the amount of the hard plastic, soft plastic, and/or additive to be added to a first mixer 854A. The first mixer 854A can be any suitable device such as a paddled continuous mixer, a rotary continuous mixer, a screw conveyor, an auger conveyor mixer, a mechanically vibrating mixer, and/or an agitating mixer. In this manner, the first mixer 854A can mix the hard plastics, the soft plastics, and the additives and deliver the plastics and additives to a pre-treatment mechanism 856.

The pre-treatment mechanism 856 can be any suitable pre-treatment mechanism such as, for example, the pre-treatment mechanism 756 described above. The system 800 further includes a second mixer 854B configured to receive the treated plastics and additives. Moreover, the separation subsystem 815 can be configured to deliver a portion of fibers to the second mixer 854B such that the fibers are mixed with the treated plastics and additives. In this manner, a mixed waste stream (e.g., including the treated plastics and additives and the fibers) can be delivered to a conditioner 855, as further described herein.

The conditioner 855 can be any suitable device and/or system configured to condition at least a portion of the waste stream for engineered fuel feed stock production. For example, in some embodiments, the conditioner 855 can be configured to increase the temperature of the constituents of the waste stream (e.g., the fiber and the capsulated plastics/sorbent). In some embodiments, the conditioner 855 can be configured to increase the moisture of the constituents of the waste stream.

The conditioner 855 can further be configured to deliver the conditioned waste stream and additives to a densifier 831. The densifier 831 can be any suitable device configured to encapsulate at least a portion of the additives into the plastics and fibers. For example, in some embodiments, the densifier 831 can be an extrusion device configured to apply a relatively high pressure (e.g., compress) to the mixture (e.g., plastics, fibers, and additives) such that the additives become evenly distributed (e.g., substantially homogenous) and/or encapsulated within the plastics and fibers. Furthermore, the densifier 831 can be configured to produce a densified intermediate material. The densified intermediate material can be in the form of cubes, briquettes, pellets, honeycomb, or other suitable shapes and forms. In some embodiments, the densified intermediate material can be used as an engineered fuel feed stock in, for example, combustion power plants (e.g., coal burning power plants). In other embodiments, the densified intermediate material can be returned to the conditioner 855 such as to further incorporate the additives and/or fibers. With the desired ratio of plastics, additives, and fibers produced a blower 870 can deliver a portion of the densified intermediate material from a bunker 861 for storage.

In some embodiments, it can be desirable to reduce the size of the intermediate material. In such embodiments, the blower 870 can be configured to deliver the engineered fuel pellets to a granulator 832. In this manner, the granulator 832 can reduce the size of the engineered fuel pellets and produce a granulated fuel feed stock. In some embodiments, the granulated fuel feed stock can be delivered to a granulated fuel bunker 863, as shown in FIG. 8. In other embodiments, it can be desirable to further reduce the size of the granulated fuel feed stock. In such embodiments, a blower 870 can deliver the granulated fuel feed stock to a pulverizer 833. In this manner, the pulverizer 833 can reduce the size of the granulated fuel feed stock to a relatively fine fuel stock. Furthermore, a blower 870 can be configured to deliver the fuel stock powder to a powdered fuel bunker 865. Therefore, the system 800 can be configured to produce an engineered fuel feed stock for a variety of conditions (e.g., the pelletized fuel stock, the granulated fuel stock, and/or the pulverized fuel stock).

As described above with reference to FIGS. 7 and 8, the engineered fuel feed stock can contain any suitable ratio of sorbent. For example, FIG. 9 shows an engineered fuel feed stock in various configurations. More specifically, a pelletized fuel stock 962A includes 40% hard plastic and 60% sorbent. In some embodiments, a pelletized fuel stock 962B includes 30% hard plastic and 70% sorbent. In some embodiments, a pelletized fuel stock 962C includes 20% hard plastic and 80% sorbent. In some embodiments, a pelletized fuel stock 962D includes 56% fiber, 14% hard plastic and 30% sorbent. In some embodiments, an engineered fuel feed stock includes about 5-50% sorbent and about 50-95% combustible material (i.e., fibers and plastics). The combustible material typically includes about 60-80% fiber and about 24-40% plastics. While shown in FIG. 9 as including specific ratios, in some embodiments, an engineered fuel feed stock can be include any sorbent-material ratio and/or configuration.

As described herein, in some embodiments, a first waste stream can be combined with an additive material. The first waste stream can include hard plastic, soft plastic, or a mixed plastic material. For example, the first waste stream can be substantially all hard plastic. In some embodiments, the first waste stream includes at least about 80 wt. %, 90 wt. %, or 95 wt. % hard plastic. In some embodiments, the first waste stream or can include less than about 40 wt. %, 30 wt. %, 20 wt. %, 10 wt. %, or 5 wt. % soft plastic. In some embodiments, the first waste stream includes less than about 20 wt. %, 10 wt. %, or 5 wt. % fibers. In some embodiments, the first waste stream includes less than about 20 wt. %, 10 wt. %, or 5 wt. % soft plastic and fiber in combination. In some embodiments, the first waste stream is substantially free from glass, metals, grit, and noncombustibles.

In some embodiments, the first waste stream and the additive are compressed to form a densified intermediate material. The densified intermediate material can have a bulk density of between about 20 lb/ft$^3$ and about 60 lb/ft$^3$. The additive can be a chemical additive such as, for example, a sorbent. In some embodiments, the sorbent can be formulated to adsorb at least one of the air pollutants including sulfur dioxide (SO2), sulfur trioxide (SO3), nitrogen oxides (NOx), hydrochloric acid (HCl), mercury (Hg), non-Hg metals and other hazardous air pollutants. For example, the additive can be sodium sesquicarbonate (Trona), sodium bicarbonate, sodium carbonate, zinc ferrite, zinc copper ferrite, zinc titanate, copper ferrite aluminate, copper aluminate, copper managanese oxide, nickel supported on alumina, zinc oxide, iron oxide, copper, copper (I) oxide, copper (II) oxide, limestone, lime, Fe, FeO, $Fe_2O_3$, $Fe_3O_4$, iron filings, $CaCO_3$, $Ca(OH)_2$, $CaCO_3.MgO$, silica, alumina, china clay, kaolinite, bauxite, emathlite, attapulgite, coal ash, egg shells, organic salts (such as calcium magnesium acetate (CMA), calcium acetate (CA), calcium formate (CF), calcium benzoate (CB), calcium propionate (CP) and magnesium acetate (MA)), urea, calcium bromide, sodium bromide, ammonium bromide, hydrogen bromide, ammonium sulfate, Lignosulfonate, or Ca-montmorillonite.

As described herein, in some embodiments, the combined first waste stream and additive can be combined with a second and/or third waste stream to form an engineered fuel feed stock. For example, the second waste stream can include hard plastic, soft plastic, or mixed plastic and the third waste stream can include fibers. In some embodiments, the second waste stream includes plastics and fibers. In some embodiments, the second waste stream includes less than about 20 wt. %, 10 wt. %, or 5 wt. % hard plastic. In some embodiments, the second waste stream includes at least about 5 wt. %, 10 wt. %, or 20 wt. % soft plastic. In some embodiments, the second waste stream includes at least about 80 wt. %, 90 wt. %, or 95 wt. % fibers. In some embodiments, the second waste stream includes at least about 95 wt. % soft plastic and fibers in combination. In some embodiments, the second waste stream is substantially free from glass, metals, grit, and noncombustibles. In some embodiments, the final engineered fuel feed stock can have a bulk density of between about 10 lb/ft$^3$ and about 60 lb/ft$^3$. In some embodiments, the final engineered fuel feed stock can have a bulk density of between about 20 lb/ft$^3$ and about 40 lb/ft$^3$.

As described herein, during the separation and classification process, various components of the waste streams can be shredded with a primary shredder and optionally a secondary shredder. In some embodiments, the hard plastic component of the waste stream has an average particle size of less than about ½ inch, ⅜ inch, ¼ inch, 3/16 inch, ⅛ inch or 3/32 inch. In some embodiments, the hard plastic component of the waste stream has an average particle size in the range between about 3/32 inch and about ¼ inch. In some embodiments, the hard plastic component of the waste stream has an average particle size in the range between about 3/32 inch and about ⅜ inch. In some embodiments, the hard plastic and soft plastic components of the waste stream have an average particle size in the range between about 3/32 inch and about ¾ inch. In some embodiments, the soft plastic component of the waste stream has an average particle size in the range between about ⅛ inch and about ⅜ inch. In some embodiments, the fiber component of the waste stream has an average particle size in the range between about ⅛ inch and about ⅜ inch. In some embodiments, the fiber and soft plastic components of the waste stream have an average particle size in the range between about ⅛ inch and about ⅜ inch.

In some embodiments, the waste streams or individual components of the waste stream are conditioned one more times during the engineered fuel feed stock production process. For example, the conditioning can include adding heat to raise the temperature of the waste stream, adding water to raise the raise the moisture content of the waste stream, or adding steam to raise the temperature and the moisture content of the waste stream. In some embodiments, the temperature of one or more of the waste streams can be raised to about 300° F., 325° F., 350° F., or 375° F. In some embodiments, the moisture content of one or more of the waste streams can be raised to at least about 5%, 10% or 15%

As described herein, one or more waste streams can be combined with an additive and then compressed to form a densified engineered fuel feed stock in a single pass (see, e.g., FIG. 8), or one or more waste streams can be combined with an additive and then compressed to form a densified intermediate material, ground, and then combined with additional waste streams before being compressed for second time to form a densified engineered fuel feed stock (see, e.g., FIG. 7). In some embodiments, the densified intermediate material and/or the densified engineered fuel feed stock can be ground (e.g., granulated or pulverized) to an average particle size of less than about ¾ inch, ⅝ inch, ½ inch, ⅜ inch, ¼ inch, 3/16 inch, ⅛ inch, 3/32 inch.

As described herein, an engineered fuel feed stock made from a processed MSW waste stream can include a hard plastic content of between about 0 wt. % and about 40 wt. %, a soft plastic content of between about 0 wt. % and about 40 wt. %, a fiber content of between about 30 wt. % and about 80 wt. %, and a sorbent content of between about 5 wt. % and about 50 wt. %. In some embodiments, the hard plastic content is between about 0 wt. % and about 20 wt. %, between about 5 wt. % and about 20 wt. %, between about 10 wt. % and about 20 wt. %, between about 5 wt. % and about 15 wt. %, or between about 10 wt. % and about 15 wt. %. In some embodiments, the soft plastic content is between about 0 wt. % and about 20 wt. %, between about 5 wt. % and about 20 wt. %, between about 10 wt. % and about 20 wt. %, between about 5 wt. % and about 15 wt. %, or between about 10 wt. % and about 15 wt. %. In some embodiments, the fiber content is between about 30 wt. % and about 60 wt. %, between about 40 wt. % and about 60 wt. %, or between about 40 wt. % and about 50 wt. %. In some embodiments, the sorbent content is between about 10 wt. % and about 40 wt. %, between about 20 wt. % and about 40 wt. %, or between about 30 wt. % and about 40 wt. %.

As described herein, an engineered fuel feed stock made from a processed MSW waste stream can include a mixed-plastic content of between about 10 wt. % and about 40 wt. %, a fiber content of between about 30 wt. % and about 80 wt. %, and a sorbent content of between about 5 wt. % and about 50 wt. %. In some embodiments, the mixed-plastic content is between about 0 wt. % and about 20 wt. %, between about 5 wt. % and about 20 wt. %, between about 10 wt. % and about 20 wt. % and about 15 wt. %, or between about 10 wt. % and about 15 wt. %. In some embodiments, the fiber content is between about 30 wt. % and about 60 wt. %, between about 40 wt. % and about 60 wt. %, or between about 40 wt. % and about 50 wt. %. In some embodiments, the sorbent content is between about 10 wt. % and about 40 wt. %, between about 20 wt. % and about 40 wt. %, or between about 30 wt. % and about 40 wt. %.

EXAMPLES

By way of example, a fuel production process can include passing a waste stream (e.g., hard plastics, soft plastics, and/or fibers) and additives (e.g., sorbents, biomass, biomaterials, and/or the like) through a densifier any number of times to incorporate the additive into waste material. Passing the waste stream/additive mixture through the densifier multiple times increases the temperature of the constituents to facilitate incorporation of the additive into the waste material constituents.

For example, approximately 20 wt. % of hard plastic and 80 wt. % of sorbent (e.g., hydrated lime) were mixed and passed through a pelletizer 10 times to produce densified pellets of hard plastic and sorbent in order to observe the variation in physical properties of the hard plastic and/or sorbent, and determine the required temperature to produce satisfactory fuel pellets. As indicated by the arrows NN and OO in FIG. 10, the mixture of the hard plastic and sorbent are shown after a first, second, third, fourth, fifth, sixth, seventh, eighth, ninth, and tenth pass through the pelletizer. As shown, the sorbent, which is a white powdery substance, is gradually incorporated after each pass through the pelletizer. As described above, the temperature of the mixture increases with each pass through the pelletizer, thus, altering the physical properties of the hard plastic and/or sorbent. Table 1 below illustrates the temperature increase after each pass through a densifier:

TABLE 1

| # of Passes | Temperature of Densifier | Temperature of Pellets |
|---|---|---|
| 1 | 173° Fahrenheit | 110°-135° Fahrenheit |
| 2 | 175° Fahrenheit | 150°-180° Fahrenheit |
| 3 | 179° Fahrenheit | 180°-208° Fahrenheit |
| 4 | 189° Fahrenheit | 217°-239° Fahrenheit |
| 5 | 208° Fahrenheit | 245°-262° Fahrenheit |
| 6 | 212° Fahrenheit | 276°-287° Fahrenheit |
| 7 | 232° Fahrenheit | 290°-310° Fahrenheit |
| 8 | 249° Fahrenheit | 316°-323° Fahrenheit |
| 9 | 281° Fahrenheit | 337°-342° Fahrenheit |
| 10 | 292° Fahrenheit | 349°-357° Fahrenheit |
| 11 | 310° Fahrenheit | 368°-374° Fahrenheit |

Figure 10:
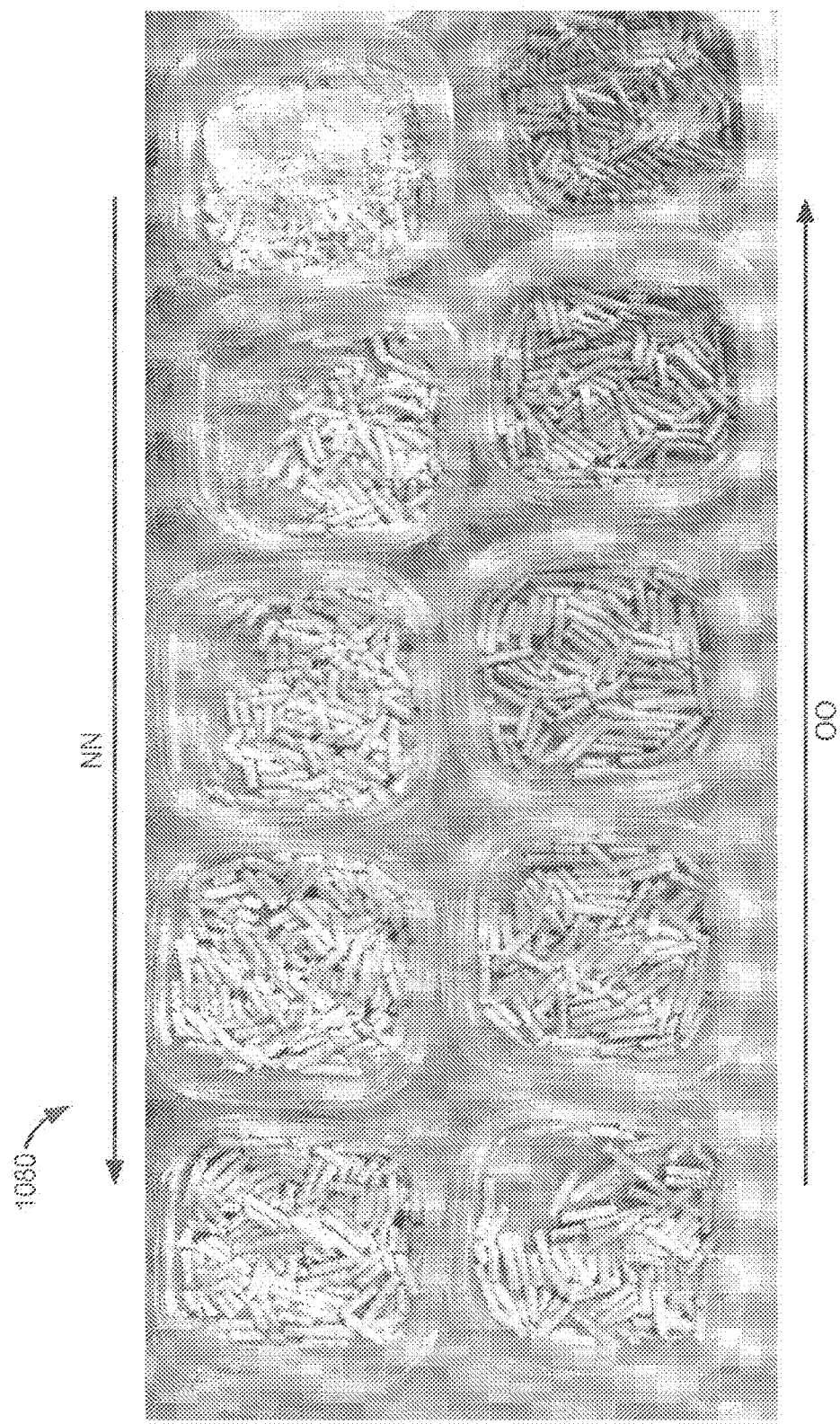
FIG. 10 is a top view of a fuel feed stock in a first stage and in a first, second, third, fourth, fifth, sixth, seventh, eighth, ninth, and tenth configuration, respectively, according to an embodiment.

As shown in FIG. 10, the sorbent is eventually incorporated into the hard plastic after 10 passes through the pelletizer (container in the lower right of FIG. 10). Although the process is shown and described in this example as including 10 passes through a pelletizer, the process can include more or fewer passes through a pelletizer or densifier. For example, the engineered fuel production process can include conditioners as described above to raise the temperature of the mixture prior to densification. In other examples, the sorbent can be selected to generate heat when mixed with the waste materials and/or waiter (e.g., quick lime).

Figure 11:
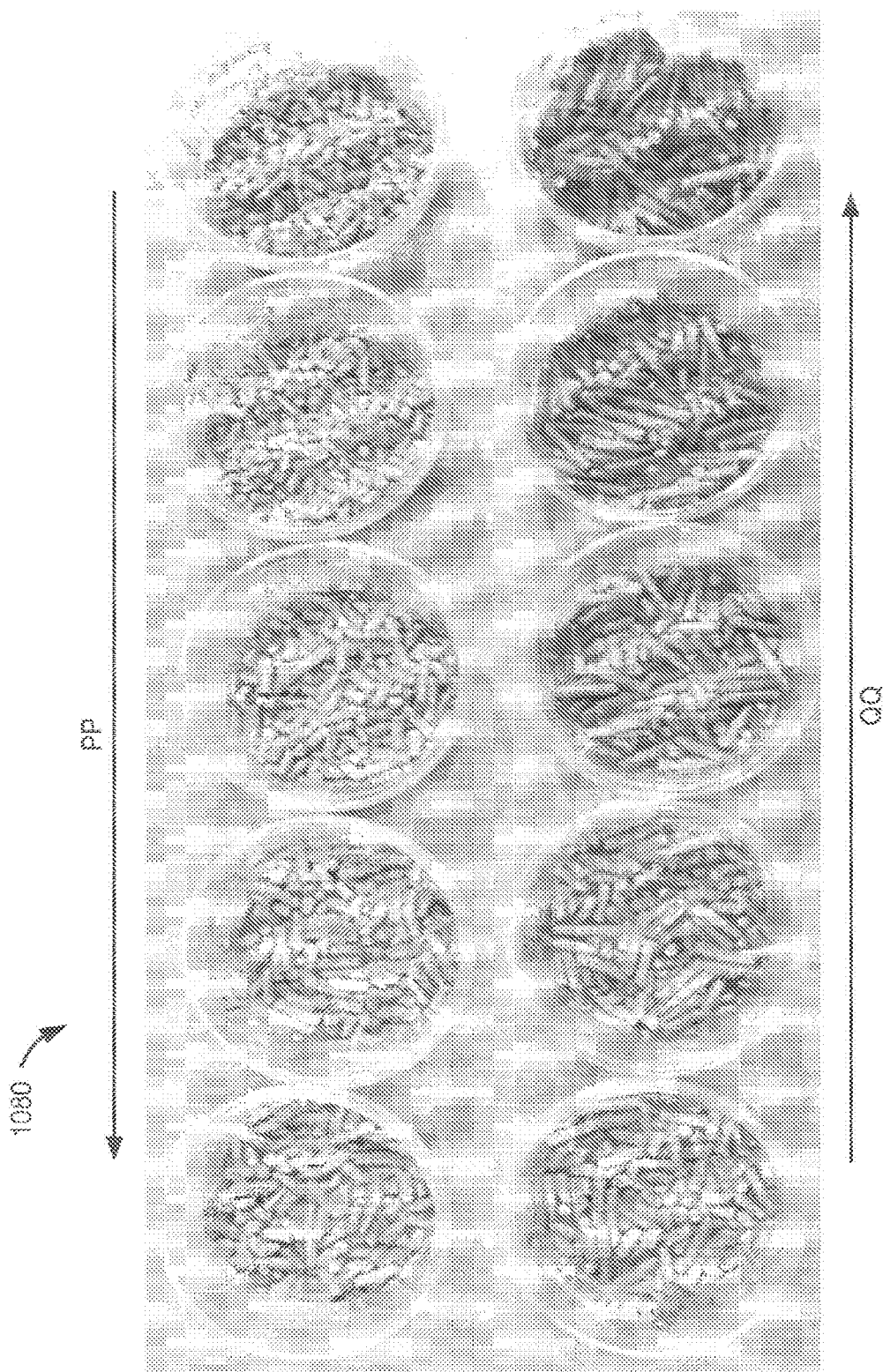
FIG. 11 is a top view of the fuel feed stock illustrated in FIG. 10 in a second stage and in a first, second, third, fourth, fifth, sixth, seventh, eighth, ninth, and tenth configuration, respectively.

The hard plastic pellets containing the sorbent (intermediate material) were then passed through a granulator to reduce the size of the engineered fuel pellets and produce a granulated fuel feed stock having an average particle size in the range of about 0.004-0.04 inches. The granulated intermediate material (37.5 wt. % of total) was mixed with 6.5 wt. % plastic and 56 wt. % fibers and passed through a pelletizer 10 times to produce densified pellets of engineered fuel feed stock containing 14 wt. % plastic, 56 wt. % fiber and 30 wt. % sorbent. FIG. 11 illustrates the mixture of the intermediate material (hard plastic and sorbent), soft plastic and, fiber after a first, second, third, fourth, fifth, sixth, seventh, eighth, ninth, and tenth pass through a pelletizer (as indicated by the arrows PP and QQ) to form densified pellets of engineered fuel feed stock. The engineered fuel pellets can be used in the pellet form, passed through a granulator to reduce the size of the engineered fuel pellets and produce a granulated fuel feed stock having an average particle size of about 0.04 inches or in the range of about 0.008-0.12 inches, or passed through a pulverizer to reduce the size of the fuel feed stock to a relatively fine fuel stock having an average particle size of about 0.02 inches or in the range of about 0.008-0.08 inches.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. Similarly, where methods and/or events described above indicate certain events and/or procedures occurring in certain order, the ordering of certain events and/or procedures may be modified. While the embodiments have been particularly shown and described, it will be understood that various changes in form and details may be made.

For example in reference to FIG. 7, while specific waste streams are described as entering the first mixer 754A and the second mixer 754B, the waste streams can be introduced to the first mixer 754A or second mixer 754B in any given configuration. For example, in some embodiments, the first mixer 754A can be configured to receive only hard plastics, only soft plastics, and/or any suitable combination of hard plastics and soft plastics. Similarly, in some embodiments, the second mixer 755B can be configured to receive only soft plastics, only fibers, and/or any suitable combination of soft plastics and fibers. Furthermore, the any constituent configuration of the first mixer 754A can be used with any constituent configuration of the second mixer 754B.

Although various embodiments have been described as having particular features and/or combinations of components, other embodiments are possible having a combination of any features and/or components from any of embodiments as discussed above.

What is claimed is:

1. A method of forming an engineered fuel feed stock from a solid waste stream, the method comprising:
   removing non-processable waste from the solid waste stream;
   shredding the solid waste stream to reduce the size of constituents of the solid waste stream to be less than a predetermined size to form a shredded solid waste stream;
   removing additional non-combustible waste from the shredded solid waste stream to form a processable waste stream;
   screening the processable waste stream to remove an undersized portion of the processable waste stream;
   separating the processable waste stream into at least a plastic stream and a fiber stream; and
   combining a quantity of the plastic stream and a quantity of the fiber stream to form the engineered fuel feed stock.

2. The method of claim 1, further comprising:
   receiving the solid waste stream on a tipping floor.

3. The method of claim 1, wherein the first predetermined size is less than 12 inches.

4. The method of claim 1, wherein the processable waste stream is separated based on bulk density.

5. The method of claim 4, wherein the processable waste is separated with an air separator.

6. The method of claim 5, wherein the processable waste stream is separated with a cyclone separator.

7. The method of claim 1, wherein removing additional non-combustible waste from the shredded waste stream includes magnetic separation.

8. The method of claim 1, wherein removing additional non-combustible waste from the shredded waste stream includes eddy current separation.

9. The method of claim 1, wherein removing additional non-combustible waste from the shredded waste stream includes glass separation.

10. The method of claim 1, further comprising:
    separating ferrous metal from the shredded solid waste stream.

11. The method of claim 1, further comprising:
    separating non-ferrous metal from the shredded solid waste stream.

12. The method of claim 1, further comprising:
    separating glass from the shredded solid waste stream.

13. The method of claim 1, further comprising:
    optically separating materials from a waste stream.

14. The method of claim 1, further comprising:
    mixing an additive with a waste stream.

15. The method of claim 1, wherein a waste stream contains biogenic waste.

16. The method of claim 1, further comprising:
    reducing the size of engineered fuel feed stock to be less than a second predetermined size.

17. The method of claim 1, further comprising:
    increasing the temperature of the engineered fuel feed stock.

18. The method of claim 1, further comprising:
    compressing the engineered fuel feed stock to form a densified engineered fuel feed stock.

19. The method of claim 1, wherein the undersized portion of the processable waste stream is a food waste.

20. The method of claim 1, wherein the solid waste stream is a municipal solid waste stream.

21. A method of forming an engineered fuel feed stock from a solid waste stream, the method comprising:
    removing non-processable waste from the solid waste stream;
    shredding the solid waste stream to reduce the size of constituents of the solid waste stream to be less than a predetermined size to form a shredded solid waste stream;
    removing ferrous metal from the shredded solid waste stream;
    removing non-ferrous metal from the shredded solid waste stream;
    removing food waste from the shredded solid waste stream;
    separating the processable waste stream into at least a plastic stream and a fiber stream; and combining a quantity of the plastic stream and a quantity of the fiber stream to form the engineered fuel feed stock.

22. The method of claim 21, further comprising:
receiving the solid waste stream on a tipping floor.

23. The method of claim 21, wherein the first predetermined size is less than 12 inches.

24. The method of claim 21, wherein removing food wastes from the shredded solid waste stream includes screening the processable waste stream to remove an undersized portion of the shredded solid waste stream.

25. The method of claim 21, wherein the processable waste stream is separated based on bulk density.

26. The method of claim 25, wherein the processable waste is separated with an air separator.

27. The method of claim 26, wherein the processable waste stream is separated with a cyclone separator.

28. The method of claim 21, further comprising:
removing additional non-combustible waste from the shredded waste stream to form a processable waste stream.

29. The method of claim 28, wherein removing additional non-combustible waste includes glass separation.

30. The method of claim 21, wherein removing ferrous metal from the shredded solid waste stream includes magnetic separation.

31. The method of claim 21, wherein removing non-ferrous metal from the shredded solid waste stream includes eddy current separation.

32. The method of claim 21, further comprising:
optically separating materials from a waste stream.

33. The method of claim 21, further comprising:
mixing an additive with a waste stream.

34. The method of claim 21, wherein a waste stream contains biogenic waste.

35. The method of claim 21, further comprising:
reducing the size of engineered fuel feed stock to be less than a second predetermined size.

36. The method of claim 21, further comprising:
increasing the temperature of the engineered fuel feed stock.

37. The method of claim 21, further comprising:
compressing the engineered fuel feed stock to form a densified engineered fuel feed stock.

38. The method of claim 21, wherein the solid waste stream is a municipal solid waste stream.

39. A method of forming an engineered fuel feed stock from a municipal solid waste stream, the method comprising:
receiving the municipal solid waste stream on a tipping floor;
removing non-processable waste from the solid waste stream;
shredding the solid waste stream to reduce the size of constituents of the solid waste stream to be less than 12 inches to form a shredded solid waste stream;
removing ferrous metal from the shredded municipal solid waste stream;
removing non-ferrous metal from the shredded municipal solid waste stream;
screening the shredded municipal solid waste stream to remove food waste;
separating the solid waste stream with an air separator into at least a plastic stream and a fiber stream;
combining a quantity of the plastic stream and a quantity of the fiber stream to form the engineered fuel feed stock.

40. The method of claim 39, further comprising:
shredding the solid waste stream to reduce the size of constituents of the waste stream to be less than a second predetermined size.

41. The method of claim 39, further comprising:
compressing the engineered fuel feed stock to form a densified engineered fuel feed stock.

42. The method of claim 39, further comprising:
optically separating materials from a waste stream.

43. The method of claim 39, further comprising:
mixing an additive with a waste stream.

44. The method of claim 39, wherein a waste stream contains biogenic waste.

* * * * *